(12) United States Patent
Sugiyama et al.

(10) Patent No.: US 9,319,339 B2
(45) Date of Patent: Apr. 19, 2016

(54) COMMUNICATION SYSTEM AND SUPERIMPOSING APPARATUS

(75) Inventors: Takeshi Sugiyama, Hyogo (JP); Tadashi Matsumoto, Osaka (JP); Ken Takahashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 182 days.

(21) Appl. No.: 13/879,618

(22) PCT Filed: Oct. 25, 2011

(86) PCT No.: PCT/JP2011/074548
§ 371 (c)(1),
(2), (4) Date: Apr. 15, 2013

(87) PCT Pub. No.: WO2012/057136
PCT Pub. Date: May 3, 2012

(65) Prior Publication Data
US 2013/0208733 A1 Aug. 15, 2013

(30) Foreign Application Priority Data
Oct. 25, 2010 (JP) ................................. 2010-239004

(51) Int. Cl.
*H04L 12/869* (2013.01)
*H04B 3/54* (2006.01)

(52) U.S. Cl.
CPC ............... *H04L 47/60* (2013.01); *H04B 3/544* (2013.01)

(58) Field of Classification Search
CPC ............ H04L 47/60; H04L 67/2842–67/2857; H04L 12/2836; H04L 49/90
USPC ................. 370/458, 278, 282, 428, 429, 442, 370/241.1–253; 455/432.1, 432.3, 435.1, 455/435.2, 435.3
See application file for complete search history.

(56) References Cited

U.S. PATENT DOCUMENTS

| 7,050,808 B2 * | 5/2006 | Janusz et al. .................. 455/445 |
| 2007/0112786 A1 * | 5/2007 | Shin .................. H04N 21/26208 |

FOREIGN PATENT DOCUMENTS

| JP | 54-40303 B | 12/1979 |
| JP | 54-040304 B | 12/1979 |

(Continued)

OTHER PUBLICATIONS

International Search Report for corresponding International Application No. PCT/JP2011/0074548 mailed Dec. 27, 2011.

(Continued)

*Primary Examiner* — Siming Liu
(74) *Attorney, Agent, or Firm* — Renner, Otto, Boisselle & Sklar, LLP

(57) ABSTRACT

The communication system includes: first terminal devices connected to a transmission path and having terminal information; a second terminal device connected to the path and sending an information request requesting the information from the first terminal device; a first superimposing apparatus interposed between the first terminal device and the path; and a second superimposing apparatus interposed between the second terminal device and the path and receiving the request from the second terminal device. The first superimposing apparatus acquires the information from the connected first terminal device at predetermined timings and stores it. Upon receiving the request, the second superimposing apparatus sends the request to the first superimposing apparatus using a superimposed signal superimposed on a transmission signal transmitted via the path. Upon receiving the request, the first superimposing apparatus sends the information to the second superimposing apparatus using the superimposed signal. Upon receiving the information, the second superimposing apparatus provides the information to the second terminal device.

8 Claims, 9 Drawing Sheets

(56) References Cited

FOREIGN PATENT DOCUMENTS

| | | |
|---|---|---|
| JP | 57-037264 B | 8/1982 |
| JP | 01-296833 A | 11/1989 |
| JP | 2000-295245 A | 10/2000 |
| JP | 2001-144868 A | 5/2001 |
| JP | 2009-225328 A | 10/2009 |
| WO | WO2006006805 * | 1/2006 |

OTHER PUBLICATIONS

PCT/ISA/237 for corresponding International Application No. PCT/JP2011/0074548 dated Dec. 27, 2011.

* cited by examiner

COMMUNICATION SYSTEM AND SUPERIMPOSING APPARATUS

TECHNICAL FIELD

The present invention relates to communication systems and superimposing apparatuses, and particularly to a communication system and a superimposing system which share a transmission path with a system using communication based on a first protocol using a transmission signal transmitted repeatedly, and in which terminal devices send and receive terminal information by use of communication based on a second protocol transmitting a superimposed signal superimposed on the transmission signal in a superimposable period.

BACKGROUND ART

In the past, a communication system in which a transmission unit (master) and communication devices (slaves) are connected to a transmission path and the respective communication devices communicate with the transmission unit has become popular. As an instance of such a communication system, there has been proposed a system in which the transmission unit periodically monitors states of the respective communication devices and. In this system, upon acknowledging a change in a state of one communication device, the transmission unit sends a signal to another communication device to perform a processing corresponding to the change in the state (see e.g., JP 1180690 B, JP 1195362 B, and JP 1144477 B).

However, in the communication with the above configuration, the communication devices consistently communicate with each other through the transmission unit, and the transmission unit polls the communication devices. Thus, a communication speed is relatively low. For example, this communication system is unsuitable for transmitting information with a relatively large data amount such as an analog quantity. Moreover, as for the aforementioned communication system, when the transmission unit malfunctions, the whole system halts. Hence, the communication system has low system reliability.

Consequently, there has been proposed a communication system designed as a mixture of an existing communication system designed to allow communication devices to communicate with each other through a transmission unit and a communication system designed to allow communication devices to directly communicate with each other via peer-to-peer (P2P) (see JP 2009-225328 A). In this communication system, a transmission path is shared by a first communication device (first communication terminal) communicating with the transmission unit (master) and second communication devices (second communication terminals) directly communicating with each other. Thus, the second communication device can be easily added on the existing communication system.

The first communication device performs first protocol communication using a transmission signal (first protocol signal) which is repeatedly sent from the transmission unit, and the second communication device performs second protocol communication using a superimposed signal (second protocol signal) which is superimposed on the transmission signal. The superimposed signal is superimposed in a predetermined superimposable period included in the transmission signal.

This kind of communication system is exemplified by a system including terminal devices connected to the transmission path via the second communication devices (see FIG. 1).

This communication system has two kinds of terminal devices including an upper terminal device 5 and lower terminal devices 61, 62, and 63. In this communication system, a transmission unit 1 is connected to a transmission path 2. The upper terminal device 5 is connected to the transmission path 2 via an upper superimposing apparatus 3 serving as a second communication device. The lower terminal devices 61, 62, and 63 are connected to the transmission path 2 via lower superimposing apparatuses 41, 42, and 43, respectively. The upper terminal device 5 is also connected to the transmission path 2 via another route without passing through the upper superimposing apparatus 3. In the following, when a distinction between the lower superimposing apparatuses 41, 42, and 43 is deemed unnecessary, each of these is referred to as the lower superimposing apparatus 4. Further, when a distinction between the lower terminal devices 61, 62, and 63 is deemed unnecessary, each of these is referred to as the lower terminal device 6.

In the aforementioned communication system, terminal information is transferred between the upper terminal device 5 and the lower terminal device 6 through the second protocol communication established between the upper superimposing apparatus 3 and the lower superimposing apparatus 4. This terminal information is power consumption of an electric appliance measured by the lower terminal device 6, for example. Specifically, when the terminal information is transferred to the upper terminal device 5 from the lower terminal device 6, the lower superimposing apparatus 4 converts the terminal information outputted from the lower terminal device 6 into the superimposed signal and sends the resultant superimposed signal to the transmission path 2, and then the upper superimposing apparatus 3 converts the superimposed signal received from the transmission path 2 into the terminal information and outputs the resultant terminal information to the upper terminal device 5.

According to the communication system using the first protocol communication and the second protocol communication, it is also possible to increase the number of the lower terminal devices 6 by means of adding the lower superimposing apparatus 4.

However, in the aforementioned system, the communication between the upper superimposing apparatus 3 and the lower superimposing apparatus 4 is serial communication using the superimposed signal. When the upper terminal device 5 collects the terminal information from a plurality of the lower terminal devices 6, a time lag of the terminal information is likely to occur between the terminal information of the respective terminal devices.

In more detail, the upper terminal device 5 acquires the terminal information from a plurality of the lower terminal devices 6 one by one. However, the communication between the upper superimposing apparatus 3 and the lower superimposing apparatus 4 is established only in the predetermined superimposable period of the transmission signal. Hence, time necessary to acquire the terminal information per one terminal device is relatively long. Consequently, a timing at which the upper terminal device 5 acquires the terminal information is greatly varied for each of the lower terminal devices 61, 62, and 63. Even when the upper terminal device 5 intends to acquire the terminal information relating to certain time, a relatively large time lag is likely to occur between the terminal information acquired from one lower terminal device 61 and time of the terminal information acquired from another lower terminal device 63.

SUMMARY OF INVENTION

In view of the above insufficiency, the present invention has aimed to propose a communication system and a superimposing apparatus which are capable of reducing a time lag which occurs between the terminal information of the respective terminal devices due to variations in timings of acquisition of the terminal information.

The first aspect of the communication system in accordance with the present invention includes a plurality of first terminal devices, a second terminal device, a first superimposing apparatus, and a second superimposing apparatus. Each of the first terminal devices is connected to a transmission path and has predetermined terminal information. The second terminal device is connected to the transmission path and is configured to send an information request for requesting the first terminal device to provide the terminal information thereof. The first superimposing apparatus is interposed between the first terminal device and the transmission path. The second superimposing apparatus is interposed between the second terminal device and the transmission path and is configured to receive the information request from the second terminal device. The first superimposing apparatus includes a terminal connection unit, a communication unit, an information acquisition unit, and a buffer unit. The terminal connection unit is used for making connection with the first terminal device. The communication unit is connected to the transmission path and is configured to communicate with the second superimposing apparatus in an available period in which the transmission path is available. The information acquisition unit is configured to acquire the terminal information from the first terminal device connected to the terminal connection unit at a predetermined timing. The buffer unit is configured to store therein the terminal information acquired by the information acquisition unit. The second superimposing apparatus is configured to, upon receiving the information request from the second terminal device, send the information request to the first superimposing apparatus in the available period. The information acquisition unit is configured to, upon receiving the information request from the second superimposing apparatus via the communication unit, retrieve the terminal information from the buffer unit and send the retrieved terminal information to the second superimposing apparatus via the communication unit. The second superimposing apparatus is configured to, upon receiving the terminal information, provide the received terminal information to the second terminal device.

As for the second aspect of the communication system in accordance with the present invention, in addition to the first aspect, the predetermined timing is determined by a trigger received by the communication unit via the transmission path.

As for the third aspect of the communication system in accordance with the present invention, in addition to the second aspect, the trigger is the information request.

As for the fourth aspect of the communication system in accordance with the present invention, in addition to the third aspect, the communication system further includes a plurality of the first superimposing apparatuses. The information request includes destination information indicative of the first terminal device which the second terminal device requests to provide the terminal information. The information acquisition unit is configured to perform a destination judgment process, an acquisition judgment process, a first reply process, a second reply process, and a third reply process. The information acquisition unit is configured to, upon receiving the information request from the second superimposing apparatus via the communication unit, perform the destination judgment process. The information acquisition unit is configured to, in the destination judgment process, judge whether or not the first terminal device indicated by the destination information is identical to the first terminal device connected to the terminal connection unit. The information acquisition unit is configured to, upon concluding that the first terminal device indicated by the destination information is identical to the first terminal device connected to the terminal connection unit through the destination judgment process, perform the acquisition judgment process, and to, upon concluding that the first terminal device indicated by the destination information is not identical to the first terminal device connected to the terminal connection unit through the destination judgment process, perform the first reply process. The information acquisition unit is configured to, in the first reply process, acquire the terminal information from the first terminal device connected to the terminal connection unit. The information acquisition unit is configured to, in the acquisition judgment process, judge whether or not the terminal information of the first terminal device indicated by the destination information is stored in the buffer unit. The information acquisition unit is configured to, upon concluding that the terminal information of the first terminal device indicated by the destination information is stored in the buffer unit through the acquisition judgment process, perform the second reply process, and to, upon concluding that the terminal information of the first terminal device indicated by the destination information is not stored in the buffer unit through the acquisition judgment process, perform the third reply process. The information acquisition unit is configured to, in the second reply process, retrieve the terminal information of the first terminal device indicated by the destination information from the buffer unit and send the retrieved terminal information to the second superimposing apparatus via the communication unit. The information acquisition unit is configured to, in the third reply process, acquire the terminal information from the first terminal device connected to the terminal connection unit, and send the acquired terminal information to the second superimposing apparatus via the communication unit.

As for the fifth aspect of the communication system in accordance with the present invention, in addition to the fourth aspect, the second terminal device is configured to perform a collection process of sending in turn the information request to the first terminal devices. The information request sent in the collection process includes identification information commonly assigned. The information acquisition unit is configured to perform a reception judgment process of judging whether or not the information acquisition unit has already received the information request including the identification information identical to the identification information included in the currently received information request. The information acquisition unit is configured to, upon concluding that the information acquisition unit has already received the information request including the same identification information as the currently received information request through the reception judgment process, not perform the first reply process. The information acquisition unit is configured to, upon concluding that the information acquisition unit has not yet received the information request including the same identification information as the currently received information request through the reception judgment process, perform the first reply process.

As for the sixth aspect of the communication system in accordance with the present invention, in addition to any one of the first to fifth aspects, the terminal connection unit is connected to a plurality of the first terminal devices. The information acquisition unit is configured to acquire the terminal information from the respective first terminal devices connected to the terminal connection unit at the predetermined timing.

As for the seventh aspect of the communication system in accordance with the present invention, in addition to the sixth aspect, the information request includes destination information indicative of the first terminal device which the second terminal device requests to provide the terminal information. The information acquisition unit is configured to, upon receiving the information request from the second superimposing device via the communication unit, retrieve the terminal information of the respective first terminal devices from the buffer unit and send the retrieved terminal information to the second superimposing device via the communication unit. The second superimposing device is configured to, upon receiving the terminal information from the first superimposing device, store the received terminal information therein and select the terminal information corresponding to the first terminal device indicated by the destination information included in the information request from the stored terminal information, and send the selected terminal information to the second terminal device.

As for the eighth aspect of the communication system in accordance with the present invention, in addition to any one of the first to seventh aspects, the transmission path is used for transmission of a transmission signal based on a communication protocol different from a communication protocol between the first superimposing apparatus and the second superimposing apparatus. The available period is defined as a period in which a superimposed signal is allowed to be superimposed on the transmission signal. The communication unit is configured to communicate with the second superimposing apparatus by use of the superimposed signal. The second superimposing apparatus is configured to send the information request to the first superimposing apparatus using the superimposing signal.

The superimposing apparatus in accordance with the present invention includes a terminal connection unit, a communication unit, an information acquisition unit, and a buffer unit. The terminal connection unit is used for making connection with a terminal device having predetermined terminal information. The communication unit is connected to a transmission path and is configured to make communication in an available period in which the transmission path is available. The information acquisition unit is configured to acquire the terminal information from the terminal device connected to the terminal connection unit at a predetermined timing. The buffer unit is configured to store therein the terminal information acquired by the information acquisition unit. The information acquisition unit is configured to, upon receiving an information request for requesting the terminal device to provide the terminal information thereof via the communication unit, retrieve the terminal information from the buffer unit and send the retrieved terminal information to the transmission path via the communication unit.

DESCRIPTION OF EMBODIMENTS

First Embodiment

Figure 1:
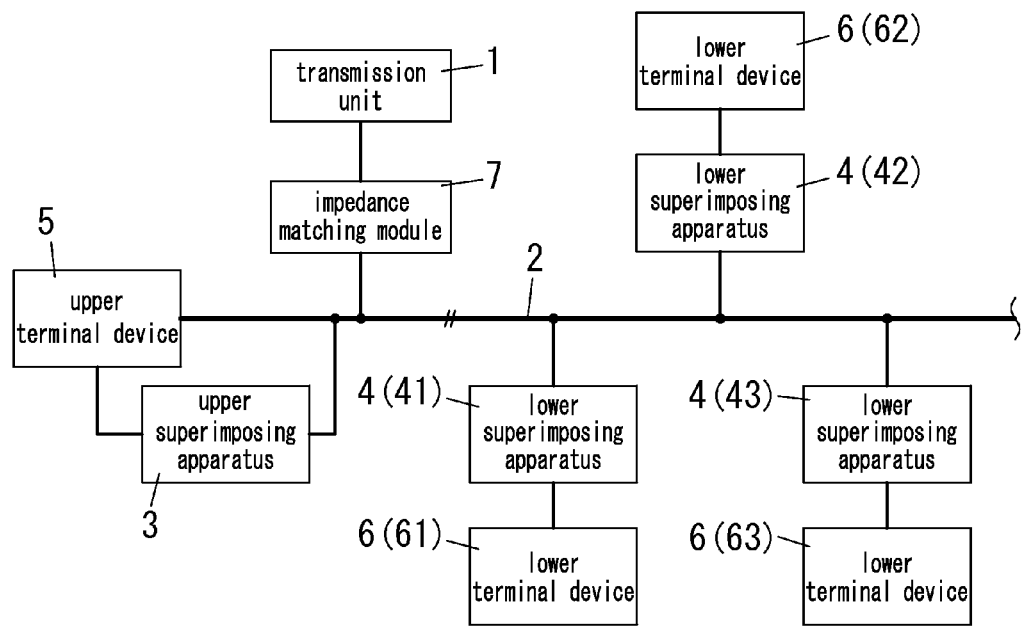
FIG. 1 is a schematic diagram illustrating the communication system of the first embodiment.

As shown in FIG. 1, the communication system of the present embodiment is a communication system including a transmission unit 1 connected to a transmission path 2 constituted by two wires.

This communication system includes two kinds of terminal devices including an upper terminal device (second terminal device) 5 connected to the transmission path 2 via an upper superimposing apparatus (second superimposing apparatus) 3 acting as a second communication device, and lower terminal devices (first terminal devices) 61, 62, and 63 connected to the transmission path 2 via respective lower superimposing apparatuses (first superimposing apparatuses) 41, 42, and 43. The upper terminal device 5 is also connected to the transmission path 2 via a route not passing through the upper superimposing apparatus 3. In this communication system, communication is performed by use of a transmission signal outputted to the transmission path 2 from the transmission unit 1 and a superimposed signal superimposed on the transmission signal. The superimposed signal is a signal having a frequency higher than that of the transmission signal. Interposed between the transmission unit 1 and the transmission path 2 is an impedance matching module 7 acting as a high impedance element for the superimposed signal.

In the following explanations, when a distinction between the lower superimposing apparatuses 41, 42, and 43 is deemed unnecessary, each of these is referred to as the lower superimposing apparatus 4. Further, when a distinction between the lower terminal devices 61, 62, and 63 respectively connected to the lower superimposing apparatuses 41, 42, and 43 is deemed unnecessary, each of these is referred to as the lower terminal device 6. Note that, FIG. 1 shows an instance where the three lower superimposing apparatuses 4 are connected to the transmission path 2, but this instance is not intended to restrict the number of the lower superimposing apparatuses 4 connectable to the transmission path 2.

As shown in FIG. 1, the communication system of the present embodiment includes a plurality of the lower terminal devices (first terminal devices) 6, the upper terminal device (second terminal device) 5, the lower superimposing apparatus (first superimposing apparatus) 4, and the upper superimposing apparatus (second superimposing apparatus) 3. Each of the lower terminal devices (first terminal devices) 6 is connected to the transmission path 2 and has predetermined terminal information. The upper terminal device (second terminal device) 5 is connected to the transmission path 2 and is configured to send an information request for requesting the lower terminal device 6 to provide the information from thereof. The lower superimposing apparatus (first superimposing apparatus) 4 is interposed between the lower terminal device 6 and the transmission path 2. The upper superimposing apparatus (second superimposing apparatus) 3 is interposed between the upper terminal device 5 and the transmission path 2 and is configured to receive the information request from the upper terminal device 5.

In the present embodiment, the upper terminal device (second terminal device) 5 is configured to perform a collection process of sending in turn the information request to the lower terminal devices (first terminal devices) 6. The information request sent in the collection process includes identification information commonly assigned. Further, the information request includes destination information indicative of the lower terminal device (first terminal device) 6 which the upper terminal device (second terminal device) 5 requests to provide the terminal information.

The upper superimposing apparatus (second superimposing apparatus) 3 is configured to, upon receiving the information request from the upper terminal device (second terminal device) 5, send the information request to the lower superimposing apparatus (first superimposing apparatus) 4 by use of the superimposing signal. The upper superimposing apparatus (second superimposing apparatus) 3 is configured to, upon receiving the terminal information, provide the received terminal information to the upper terminal device (second terminal device) 5.

Figure 2:
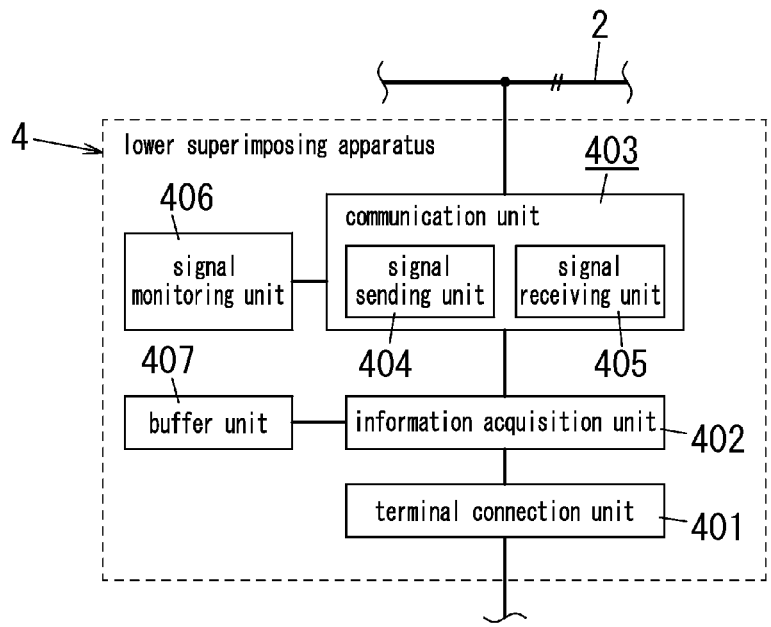
FIG. 2 is a block diagram illustrating the lower superimposing apparatus of the communication system of the first embodiment.

As shown in FIG. 2, the lower superimposing apparatus (first superimposing apparatus) 4 includes a terminal connection unit (first terminal connection unit) 401, an information acquisition unit 402, a communication unit (first communication unit) 403, and a buffer unit 407.

The first terminal connection unit 401 is used for making connection with the lower terminal device (first terminal device) 6. In the present embodiment, the first terminal connection units 401 of the lower superimposing apparatuses 41, 42, and 43 are connected to the lower terminal devices 61, 62, and 63, respectively.

The first communication unit 403 is connected to the transmission path 2 and is configured to communicate with the upper superimposing apparatus (second superimposing apparatus) 5 in an available period in which the transmission path 2 is available. In the present embodiment, the transmission path 2 is used for transmission of a transmission signal (see FIG. 4) based on a communication protocol (first protocol) different from a communication protocol (second protocol) between the lower superimposing apparatus 4 and the upper superimposing apparatus 3. The available period is defined as a period (superimposable period) in which a superimposed signal is allowed to be superimposed on the transmission signal. In the present embodiment, the communication unit (first communication unit) 403 of the lower superimposing apparatus 4 is configured to communicate with the upper superimposing apparatus 3 by use of the superimposed signal.

The information acquisition unit 402 is configured to acquire the terminal information from the lower terminal device (first terminal device) 6 connected to the terminal connection unit 401 at a predetermined timing. In the present embodiment, the information acquisition units 402 of the lower superimposing apparatuses 41, 42, and 43 acquire the terminal information from the lower terminal devices 61, 62, and 63, respectively.

The buffer unit 407 is configured to store therein the terminal information acquired by the information acquisition unit 402. In the present embodiment, the buffer units 407 of the lower superimposing apparatuses 41, 42, and 43 store therein the terminal information of the lower terminal devices 61, 62, and 63, respectively.

Further, the information acquisition unit 402 is configured to, upon receiving the information request from the upper superimposing apparatus 3 via the first communication unit 403, retrieve the terminal information from the buffer unit 407 and send the retrieved terminal information to the upper superimposing apparatus 3 via the first communication unit 403.

The communication system of the present embodiment is explained in detail below.

There is a plurality of communication devices (not shown) connected to the transmission path 2. The communication devices communicate with each other by use of the transmission signal transmitted repeatedly by the transmission unit 1. These communication devices are connected in parallel to the transmission unit 1 through the transmission path 2, and make communication based on the first protocol through the transmission unit 1 by use of the transmission signal. The transmission unit 1 and the communication devices constitute a time-division multiplex communication system (hereinafter referred to as "base system") in which data transmission from the transmission unit 1 to the communication device and data transmission from the communication device to the transmission unit 1 are executed in a time-division manner.

In view of the base system, for example, the communication device is categorized into two kinds of devices including a monitoring device attached to a switch (not shown) or a sensor (not shown) and a control terminal device attached to a load (not shown). Hence, it is possible to control a load attached to the control terminal device in response to a monitoring input from a switch or a sensor attached to the monitoring terminal device. Each of the communication devices stores an own address preliminarily assigned thereto in a storage (not shown) thereof.

Upon receiving the monitoring input, the monitoring terminal device transmits control information corresponding to the monitoring input received to the transmission unit 1. Upon receiving the control information, the transmission unit 1 transmits the control information to the control terminal device which is associated with the monitoring terminal device by use of the addresses. Upon receiving the control information, the control terminal device controls the load in accordance with the control information received. Since, the control information reflects the monitoring input from a switch etc., the monitoring input from a switch etc., is reflected on the control of the load.

Figure 4:
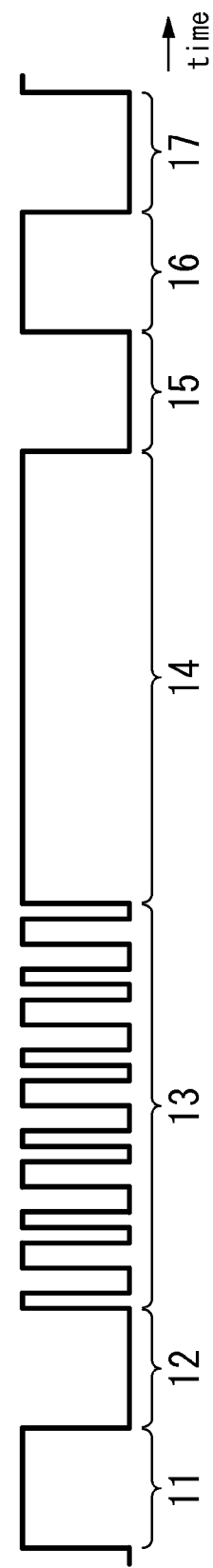
FIG. 4 is a waveform chart illustrating a transmission signal transmitted via the transmission path used by the communication system of the first embodiment.

The transmission unit 1 sends, to the transmission path 2, the transmission signal as illustrated in FIG. 4. The transmission signal in conformity with a time-division system has a voltage waveform which is divided into a plurality of periods in a time axis direction. For example, the transmission signal is a time-division multiplex signal which is constituted by a preliminary interrupt period 11, a preliminary period 12, a transmission period 13, a return period 14, an interrupt period 15, a short-circuit detection period 16, and a rest period 17, and has two different states (±24 V). The preliminary interrupt period 11 serves as a period for detecting a secondary interrupt. The preliminary period 12 is a period in accordance with the interrupt period 15 and the shunt detection period 16. The transmission period 13 serves as a period for transmitting data to a communication device. The return period 14 serves as a time slot for receiving a return signal from a communication device. The interrupt period 15 serves as a period for detecting an interrupt signal mentioned below. The short-circuit detection period 16 serves as a period for detecting short-circuit. The rest period 17 serves as a period for compensating a delay in a processing. The transmission signal is a signal used for transmitting data by means of modulating a carrier constituted by a series of pulses.

Next, an explanation is made to an operation of the base system.

As for each of the communication devices, when address data included in the transmission period 13 of the transmission signal received via the transmission path 2 is identical to the address stored in the storage unit, the communication device retrieves the control information for controlling the load from the transmission signal. Further, the communication device returns the control information as a current mode signal, which is transmitted by means of short-circuiting the transmission path 2 via an appropriate low impedance element, in synchronization with the return period 14 of the transmission signal. Besides, the transmission signal transmitted via the transmission path 2 is rectified and stabilized and then is supplied, as electrical power, to an internal circuit of the communication device.

The transmission unit 1 normally performs a constant polling process of accessing the communication devices in turn by means of cyclically changing the address data included in the transmission signal. While the constant polling process is performed, when the transmission signal includes the control information, the communication device having the address identical to the address data included in the transmission signal acquires the control information and then operates, and returns its operation state to the transmission unit 1.

Further, upon receiving an interrupt signal generated by a monitoring terminal device (communication device) in response to a monitoring input of a switch etc., the transmission unit 1 searches for the communication device which has generated the interrupt signal, and accesses the detected communication device and also performs an interrupt polling process.

In brief, the transmission unit 1 normally sends the transmission signal having mode data representing a normal mode. Upon detecting the interrupt signal generated by the monitoring terminal device (communication device) in synchronization with the interrupt period 15 of the transmission signal, the transmission unit 1 sends the transmission signal having the mode data representing an interrupt polling mode.

When the communication device which has generated the interrupt signal acknowledges that its own address has the same high order bit as the address data of the received transmission signal of the interrupt polling mode, the communication device returns a low order bit of its own address as return data in synchronization with the return period 14 of the received transmission signal. Through this process, the transmission unit 1 can acquire the address of the communication device which has generated the interrupt signal.

Upon acquiring the address of the communication device having generated the interrupt signal, the transmission unit 1 sends the transmission signal for requesting return of the control information to this communication device, and the communication device returns the control information corresponding to the monitoring input of the switch etc., to the transmission unit 1. Upon receiving the control information, the transmission unit 1 instructs the communication device to clear its monitoring input, and this communication device informs the transmission unit 1 that the monitoring input has cleared.

Upon receiving the control information, the transmission unit 1 creates the control information to be transmitted to the communication device (control terminal device) associated, by a correspondence relation of the address, with the communication device (monitoring terminal device) which is a sender of the control information. The transmission unit 1 sends the transmission signal including the newly created control information to the transmission path 2, thereby controlling the load attached to the communication device (control terminal device).

As described above, in the base system, the communication devices (the monitoring terminal device and the control terminal device) communicate with each other through the transmission unit 1 in accordance with a polling/selecting protocol (first protocol).

In the present embodiment, the upper terminal device 5 also serves as the communication device of the base system. When the upper terminal device 5 communicates with the transmission unit 1 based on the first protocol on behalf of the communication device, the upper terminal device 5 communicates with the transmission unit 1 through the transmission path 2 without passing through the upper superimposing apparatus 3. Note that the impedance matching modules 7 acting as high impedance elements for the superimposed signal may be interposed between the transmission path 2 and the respective communication devices of the base system.

In the communication system of the present embodiment, while sharing the transmission path 2 with the base system, the upper terminal device 5 and the lower terminal device 6 use the superimposed signal superimposed on the transmission signal of the first protocol to establish the second protocol communication, thereby sending and receiving the terminal information. This terminal information is power consumption of an electric appliance measured by the lower terminal device 6, for example. In the present embodiment, the lower superimposing apparatus 4 converts the terminal information outputted from the lower terminal device 6 into the superimposed signal and sends the resultant superimposed signal to the transmission path 2, and the upper superimposing apparatus 3 converts the superimposed signal received from the transmission path 2 into the terminal information and outputs the resultant terminal information to the upper terminal device 5. According to this procedure, the upper terminal device 5 can collect the terminal information from the lower terminal device 6. Note that, the communication between the upper terminal device 5 and the upper superimposing apparatus 3 and the communication between the lower terminal device 6 and the lower superimposing apparatus 4 can be implemented by use of serial communication based on RS 485, for example.

Further, in the present embodiment, with regard to the second protocol communication, the upper terminal device 5 serves as a master and the lower terminal device 6 serves as a slave. The upper terminal device 5 acting as the master polls the lower terminal device 6 acting as the slave, and acquires the terminal information from each of the lower terminal devices 6 as a response to this polling. In the present embodiment, since there is a plurality of the lower terminal devices 6, the upper terminal device 5 functioning as the master polls the plurality of the lower terminal devices 61, 62, and 63 functioning as the slaves in order.

Although the upper terminal device 5 and the lower terminal device 6 receive the terminal information, the upper superimposing apparatus 3 and the lower superimposing apparatus 4 send and receive the superimposed signal of the second protocol to and from the transmission path 2. In other words, the upper superimposing apparatus 3 functions as an adapter which is interposed between the transmission path 2 and the upper terminal device 5 connected to the upper superimposing apparatus 3 and converts between the transmission data (terminal information) and the superimposed signal, and the lower superimposing apparatus 4 functions as an adapter which is interposed between the transmission path 2 and the lower terminal device 6 connected to the lower superimposing apparatus 4 and converts between the transmission data (terminal information) and the superimposed signal.

Consequently, in accordance with the protocol (second protocol) different from the aforementioned first protocol, the upper terminal device 5 can acquire the terminal information from the lower terminal device 6 by means of a peer-to-peer (P2P) connection without passing through the transmission path 2. In brief, while the communication between the communication devices based on the first protocol is performed by way of the transmission unit 1, the communication between the upper terminal device 5 and the lower terminal device 6 based on the second protocol is directly performed between the terminal devices without passing through the transmission unit 1. Thus, the second protocol communication can have a high communication speed relative to the first protocol communication, and is used for transmission of data having relatively large data amount such as an analog quantity (e.g., power consumption).

As shown in FIG. 2, the lower superimposing apparatus 4 includes the terminal connection unit 401 connected to the lower terminal device 6, the information acquisition unit 402 connected to the terminal connection unit 401, and the communication unit 403 connected to the information acquisition unit 402. The communication unit 403 is connected to the transmission path 2, and includes a signal sending unit 404 configured to send the superimposed signal and a signal receiving unit 405 configured to receive the superimposed signal.

The information acquisition unit 402 acquires the terminal information from the lower terminal device 6 connected to the terminal connection unit 401, via the terminal connection unit 401. The communication unit 403 returns the terminal information in the form of the superimposed signal to the upper superimposing apparatus 3 in response to the information request transmitted as the superimposed signal from the upper superimposing apparatus 3. The information request is defined as a signal which the upper terminal device 5 outputs in order to request return of the terminal information from the lower terminal device 6. The upper terminal device 5 selects a destination of the information request from the lower terminal devices 6 and then outputs the information request.

Further, the lower superimposing apparatus 4 includes a signal monitoring unit 406 configured to monitor the transmission signal transmitted between the transmission unit 1 and the communication device of the base system. The signal monitoring unit 406 analyzes a data transmission condition (hereinafter referred to as "state") from the transmission signal. The signal sending unit 404 has a function of judging whether or not the state determined by the signal monitoring unit 406 is a condition suitable for superimposition of the superimposed signal, and of sending the superimposed signal when the signal sending unit 404 determines that the state is the condition suitable for superimposition of the superimposed signal.

As mentioned above, the transmission signal is based on a signal format as illustrated in FIG. 4. With regard to the preliminary interrupt period 11, the preliminary period 12, and the rest period 17, even if the superimposed signal is superimposed, the communication using the transmission signal is not affected. Further, the communication between the terminal devices using the superimposed signal is insusceptible to the transmission signal. Thus, the preliminary interrupt period 11, the preliminary period 12, and the rest period 17 can be used as a period (hereinafter referred to as "superimposable period") in which the superimposed signal is allowed to be superimposed.

With regard to the other periods (the transmission period 13, the return period 14, the interrupt period 15, and the short-circuit detection period 16), since a period in which the transmission signal is stably kept at a high level or a low level is relatively short, the communication using the transmission signal is susceptible to the superimposed signal. When the superimposed signal is superimposed in the other period, the communication between the terminal devices using the superimposed signal is susceptible to a signal (e.g., the interrupt signal and the return data) received and sent between the transmission unit 1 and the communication device. Therefore, the other periods are considered as a period unusable for superimposition of the superimposed signal.

Moreover, periods of a rising edge and a falling edge of the transmission signal are not suitable for superimposition of the superimposed signal, because of influences of harmonic noises and a transient response accompanied with a voltage reversion of a signal. Therefore, even when a predetermined period (e.g., 300 µs) subsequent to switching of a period (the rising edge or the falling edge) is included in any one of the preliminary interrupt period 11, the preliminary period 12, and the rest period 17 of the transmission signal, such a predetermined period is also considered as the unsuperimposable period.

As mentioned above, the transmission path 2 has the superimposable period (available period) and the unsuperimposable period ("unavailable period"). Especially, the superimposable period is a partial period of the period for transmitting the transmission signal.

In view of the above, the signal sending unit 404 is configured to judge whether the current period is the superimposable period or the unsuperimposable period based on the analysis result of the state of the transmission signal, and, only when the signal sending unit 404 concludes that the current period is the superimposable period, send the superimposed signal. As mentioned above, the lower superimposing apparatus 4 superimposes the superimposed signal only in the superimposable period of the transmission signal in synchronization with the transmission signal, thereby avoiding interference between the first protocol communication and the second protocol communication sharing the common transmission path 2.

In the present embodiment, when the signal sending unit 404 fails to send the transmission data in one superimposable period due to a large data amount of the transmission data, the signal sending unit 404 temporarily terminates communication at the end of the current superimposable period and sends the remaining data in the next superimposable period.

Figure 3:
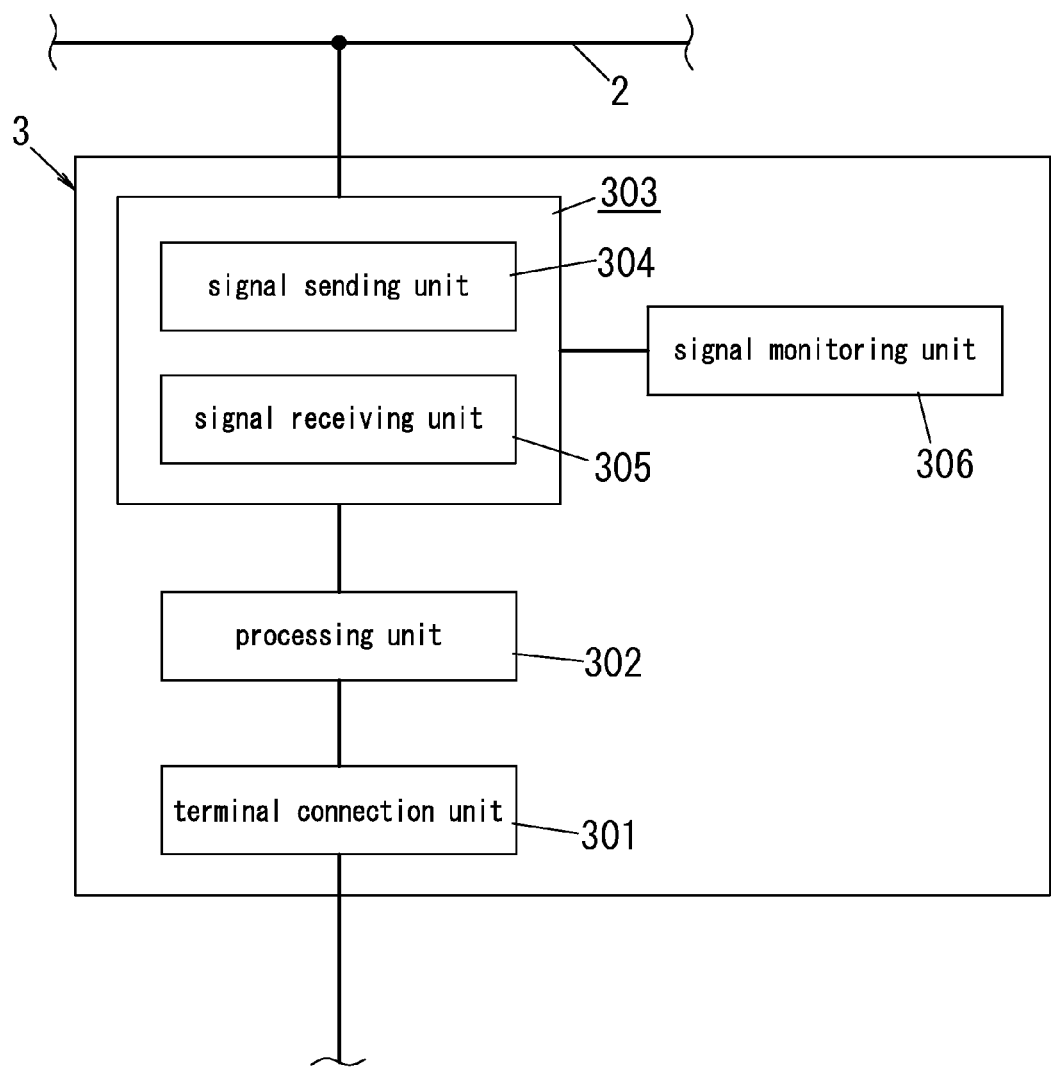
FIG. 3 is a block diagram illustrating the upper superimposing apparatus of the communication system of the first embodiment.

The upper superimposing apparatus 3 has a basic configuration similar to that of the lower superimposing apparatus 4. As shown in FIG. 3, the upper superimposing apparatus 3 includes the terminal connection unit (second terminal connection unit) 301 connected to the upper terminal device 5, the communication unit (second communication unit) 303 connected to the transmission path 2, and the signal monitoring unit 306. The communication unit 303 is connected to the transmission path 2, and includes a signal sending unit 304 configured to send the superimposed signal and a signal receiving unit 305 configured to receive the superimposed signal. Further, the upper superimposing apparatus 3 is provided with a processing unit 302 interposed between the terminal connection unit (second terminal connection unit) 301 and the communication unit (second communication unit) 303 and configured to process information transferred between the upper terminal device 5 and the lower terminal device 6.

As mentioned above, the lower superimposing apparatus 4 includes the second terminal connection unit 301, the second communication unit 303, and the processing unit 302.

The second terminal connection unit 301 is used for making connection with the upper terminal device (second terminal device) 5.

The second communication unit 303 is connected to the transmission path 2 and is configured to communicate with the lower superimposing apparatus (first superimposing apparatus) 4 in the available period (superimposable period). In the present embodiment, the communication unit (second communication unit) 303 of the upper superimposing apparatus 3 is configured to send the information request to the upper superimposing apparatus 3 by use of the superimposed signal.

The processing unit 302 is configured to, upon receiving the information request from the upper terminal device (second terminal device) 5 connected to the second terminal connection unit 301, send the received information request to the first superimposing apparatus 4 via the second communication unit 303. In the present embodiment, the information request is sent to all the first superimposing apparatuses 4 connected to the transmission path 2. In other words, the second superimposing apparatus broadcasts the information request. Moreover, the processing unit 302 is configured to, upon receiving the terminal information from the first superimposing apparatus 4 via the second communication unit 303, provide the received terminal information to the upper terminal device (second terminal device) 5 connected to the second terminal connection unit 301.

In brief, when the upper superimposing apparatus 3 receives the information request from the upper terminal device 5, the upper superimposing apparatus 3 sends the received information request to the lower superimposing apparatus 4 in the available period. In other words, the upper superimposing apparatus 3 sends the information request to the lower superimposing apparatus 4 by use of the superimposed signal. Additionally, when the upper superimposing apparatus 3 receives the terminal information from the lower superimposing apparatus 4, the upper superimposing apparatus 3 sends the received terminal information to the upper terminal device 5.

Note that, like the communication device of the base system, power is supplied to the upper terminal device 5 and the lower terminal device 6 by use of a system (centralized power supply system) of creating power by rectifying and stabilizing the transmission signal transmitted via the transmission path 2. However, a power supply system used in the present embodiment is not limited to this system. For example, power may be supplied to the upper terminal device 5 and the lower terminal device 6 by use of a system (local power supply system) of creating power by rectifying and stabilizing power supplied from a commercial AC source.

In the present embodiment, as shown in FIG. 4, the lower superimposing apparatus 4 is provided with the buffer unit 407 configured to store the terminal information acquired by the information acquisition unit 402. Accordingly, the lower superimposing apparatus 4 can preliminarily acquire the terminal information of the lower terminal device 6 connected thereto by use of the information acquisition unit 402 and store the acquired terminal information in the buffer unit 407.

The information acquisition unit 402 acquires the terminal information at a designated timing, and temporarily stores the acquired terminal information in the buffer unit 407 until receiving the information request to the lower terminal device 6 connected to the terminal connection unit 401. The terminal information stored in the buffer unit 407 is sent to the upper terminal device 5 via the communication unit 403 in response to the information request to the lower terminal device 6 connected to the terminal connection unit 401. The terminal information stored in the buffer unit 407 is deleted from the buffer unit 407 at the timing at which the terminal information is returned by the communication unit 403.

In the present embodiment, the information acquisition unit 402 acquires the terminal information from the lower terminal device 6 at a timing designated by a trigger from another device connected to the transmission path 2 (the predetermined timing is determined by the trigger received by the first communication unit 403 via the transmission path 2). In other words, the information acquisition unit 402 starts acquisition of the terminal information from the lower terminal device 6 at the timing at which the communication unit 403 receives the trigger sent by another device to the transmission path 2.

In the present embodiment, the trigger is the information request which the upper terminal device 5 outputs in order to request the lower terminal device 6 to send back the terminal information (the trigger is used as the information request). The upper terminal device 5 sends the information request to the respective lower terminal devices 61, 62, and 63 in order for the purpose of acquiring the terminal information from the plurality of the lower terminal devices 6 by polling them. Hence, this information request is used as a trigger, and the information acquisition unit 402 operates in response to this trigger. In brief, the information acquisition unit 402 outputs the information request to the lower terminal device 6 connected to the terminal connection unit 401, thereby acquiring the terminal information from the lower terminal device 6 as a response of the lower terminal device 6.

In the present embodiment, not only when the lower superimposing apparatus 4 receives the information request to the lower terminal device 6 connected thereto but also when the lower superimposing apparatus 4 receives the information request to the lower terminal device 6 connected to the other lower superimposing apparatus 4, the lower superimposing apparatus 4 acknowledges the information request as the trigger, and acquires the terminal information from the information acquisition unit 402. For example, the lower superimposing apparatus 4 receives the information request from the upper superimposing apparatus 3 at the communication unit 403 irrespective of the destination of the information request. Further, the information acquisition unit 402 modifies an identifier (address) of the lower terminal device 6 serving as the destination included in the information request such that the information request directed (destined) to the lower terminal device 6 connected to the other lower superimposing apparatus 4 is revised as the information request directed to the lower terminal device 6 connected to itself. The information acquisition unit 402 outputs the information request including the modified destination to the lower terminal device 6 connected to itself, thereby acquiring the terminal information from the lower terminal device 6 as a response of the lower terminal device 6.

Note that, even if the lower superimposing apparatus 4 receives the terminal information directed to the lower terminal device 6 connected to the other lower superimposing apparatus 4, the lower superimposing apparatus 4 does not return the terminal information to the upper terminal device 5 via the communication unit 403 immediately. To implement this operation, upon receiving the terminal information directed to the lower terminal device 6 connected to the other lower superimposing apparatus 4, the information acquisition unit 402 stores the terminal information in the buffer unit 407 temporarily, and subsequently returns the terminal information in response to the information request directed to the lower terminal device 6 connected to itself.

The respective lower superimposing apparatuses 4 receive a series of the information requests which are sent from the upper terminal device 5 to the plurality of the lower terminal devices 61, 62, and 63 sequentially in order to request them to provide the terminal information obtained at the same timing. For example, when the upper terminal device 5 requests the terminal information every one hour, one o'clock and two o'clock and three o'clock, the upper terminal device 5 sends the information request to the lower terminal devices 61, 62, and 63 in turn at one o'clock.

In this situation, since each one of the lower superimposing apparatuses 4 also receives the information request directed to the lower terminal devices 6 connected to the other lower superimposing apparatuses 4, the lower superimposing apparatuses 4 receive information request requesting the terminal information at one o'clock multiple times (three times, in this example). Since the information request includes timing information (e.g., information representing time) indicative of a timing of acquiring the terminal information, a series of the information requests generated for requesting provision (return) of the terminal information acquired at the same timing include the common timing information representing the same timing. For this reason, in the present embodiment, the timing information is used as identification information. In brief, the information requests sent in the collection process include the common (same) timing information.

In view of the above, in the present embodiment, with regard to a series of the information requests generated for requesting provision of the terminal information acquired at the same timing, the information acquisition unit 402 is configured to acquire the terminal information from the lower terminal device 6 only once. In more detail, when the information requests including the timing information representing one o'clock are sent in order of the lower terminal devices 61, 62, and 63, for example, the information acquisition units 402 of the respective lower superimposing apparatuses 4 regard, as the trigger, only the information request directed to the lower terminal device 61 which is received first, and acquire the terminal information.

The information acquisition unit 402 is configured to perform a destination judgment process, an acquisition judgment process, a first reply process, a second reply process, and a third reply process.

The information acquisition unit 402 is configured to, upon receiving the information request from the upper superimposing apparatus 4 via the first communication unit 403, perform the destination judgment process.

The information acquisition unit 402 is configured to, in the destination judgment process, judge whether or not the lower terminal device (first terminal device) 6 indicated by the received destination information is identical to the lower terminal device (first terminal device) 6 connected to the first terminal connection unit 401. The information acquisition unit 402 is configured to, upon concluding that the lower terminal device (first terminal device) 6 indicated by the destination information is identical to the lower terminal device (first terminal device) 6 connected to the first terminal connection unit 401 through the destination judgment process, perform the acquisition judgment process. The information acquisition unit 402 is configured to, upon concluding that the lower terminal device (first terminal device) 6 indicated by the destination information is not identical to the lower terminal device (first terminal device) 6 connected to the first terminal connection unit 401 through the destination judgment process, perform the first reply process.

The information acquisition unit 402 is configured to, in the acquisition judgment process, judge whether or not the terminal information of the lower terminal device (first terminal device) 6 indicated by the destination information is stored in the buffer unit 407. The information acquisition unit 402 is configured to, upon concluding that the terminal information of the lower terminal device (first terminal device) 6 indicated by the destination information is stored in the buffer unit 407 through the acquisition judgment process, perform the second reply process. The information acquisition unit 402 is configured to, upon concluding that the terminal information of the lower terminal device (first terminal device) 6 indicated by the destination information is not stored in the buffer unit 407 through the acquisition judgment process, perform the third reply process.

The information acquisition unit 402 is configured to, in the first reply process, acquire the terminal information from the lower terminal device (first terminal device) 6 connected to the first terminal connection unit 401.

The information acquisition unit 402 is configured to, in the second reply process, retrieve the terminal information of the lower terminal device (first terminal device) 6 indicated by the destination information from the buffer unit 407 and send the retrieved terminal information to the upper superimposing apparatus (second superimposing apparatus) 3 via the first communication unit 403.

The information acquisition unit 402 is configured to, in the third reply process, acquire the terminal information from the lower terminal device (first terminal device) 6 connected to the first terminal connection unit 401, and send the acquired terminal information to the upper superimposing apparatus (second superimposing apparatus) 3 via the first communication unit 403.

Additionally, the information acquisition unit 402 is configured to perform a reception judgment process. In the present embodiment, the information acquisition unit 402 is configured to, upon concluding that the lower terminal device (first terminal device) 6 indicated by the destination information is not identical to the lower terminal device (first terminal device) 6 connected to the first terminal connection unit 401 through the destination judgment process, perform the reception judgment process.

The information acquisition unit 402 is configured to, in the reception judgment process, judge whether or not the information acquisition unit 402 has already received the information request including the identification information (in the present embodiment, the timing information) identical to the identification information included in the currently received information request. The information acquisition unit 402 is configured to, upon concluding that the information acquisition unit 402 has already received the information request including the same identification information as the currently received information request through the reception judgment process, not perform the first reply process. The information acquisition unit 402 is configured to, upon concluding that the information acquisition unit 402 has not yet received the information request including the same identification information as the currently received information request through the reception judgment process, perform the first reply process.

Note that, the reception judgment process may be performed prior to the destination judgment process. In this instance, the information acquisition unit 402 is configured to, upon concluding that the information acquisition unit 402 has already received the information request including the same identification information as the currently received information request through the reception judgment process, not perform the destination judgment process. The information acquisition unit 402 is configured to, upon concluding that the information acquisition unit 402 has not yet received the information request including the same identification information as the currently received information request through the reception judgment process, perform the destination judgment process.

Figure 5:
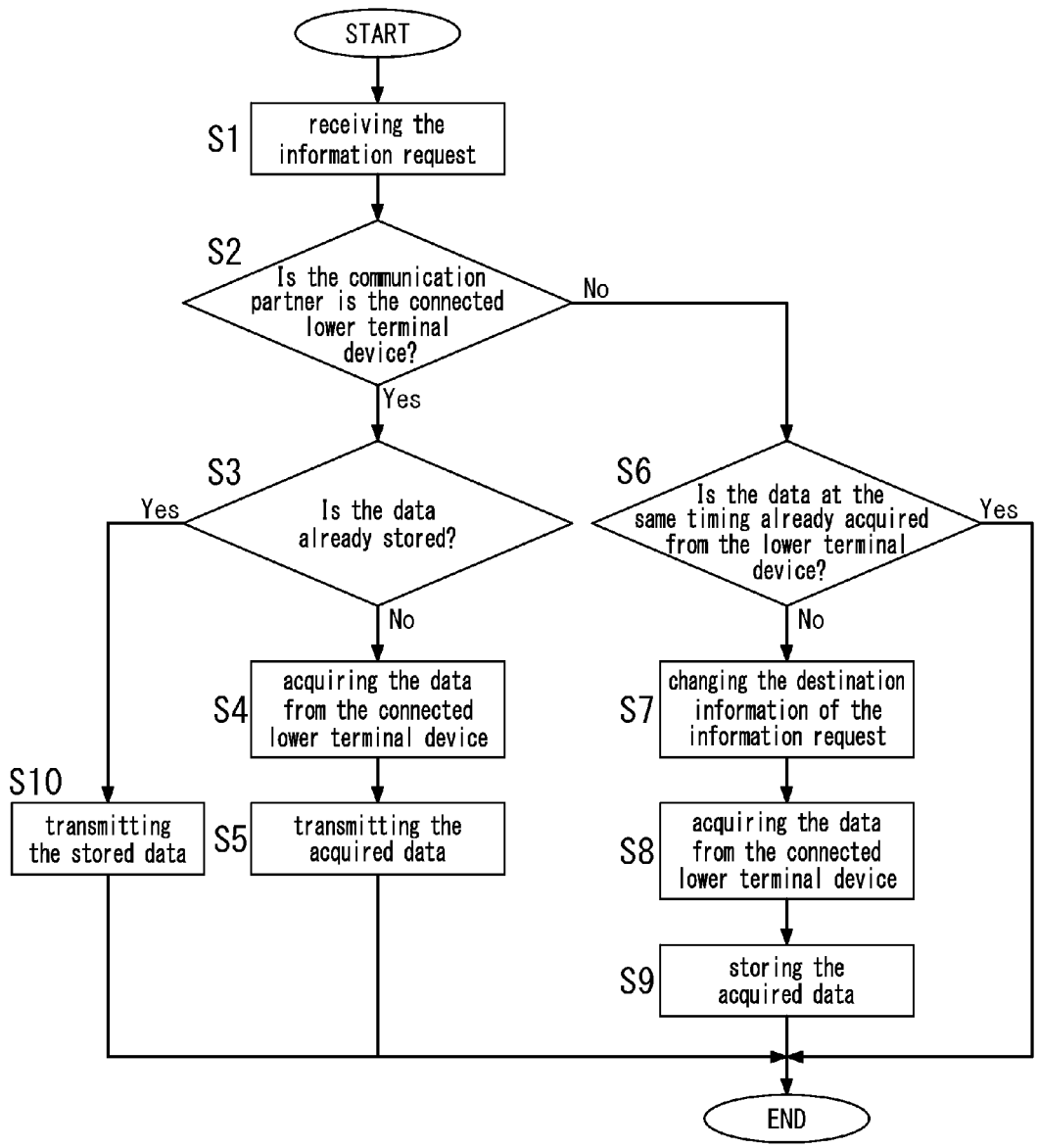
FIG. 5 is a flowchart illustrating the operation of the communication system of the first embodiment.

The following explanation referring to the flowchart illustrated in FIG. 5 is made to an operation of the lower superimposing apparatus 4 of the present embodiment.

When the lower superimposing apparatus 4 receives the information request from the upper terminal device 5 (S1), the lower superimposing apparatus 4 judges whether or not the destination of the information request is the lower terminal device 6 connected to itself (the destination judgment process "S2"). When the lower superimposing apparatus 4 determines that the received information request is directed to the lower terminal device 6 connected to itself (S2: Yes), the information acquisition unit 402 judges whether or not the acquired terminal information (data) has been already stored in the buffer unit 407 (the acquisition judgment process "S3"). When the terminal information (data) is not stored in the buffer unit 407 (S3: No), the information acquisition unit 402 acquires the terminal information (data) from the connected lower terminal device 6 (S4), and returns this terminal information (acquired data) to the upper terminal device 5 via the communication unit 403 as a response to the information request (S5). In other words, the information acquisition unit 402 performs the third reply process.

When the lower superimposing apparatus 4 determines that the received information request is not directed to the lower terminal device 6 connected to itself (S2: No), the lower superimposing apparatus 4 judges whether or not the lower superimposing apparatus 4 has already acquired the terminal information at the same timing from the lower terminal device 6 (reception judgment process "S6"). When the lower superimposing apparatus 4 has already acquired the terminal information at the same timing (S6: Yes), the lower superimposing apparatus 4 terminates the procedure. When the lower superimposing apparatus 4 has not yet acquired the terminal information relating to the same timing (S6: No), the information acquisition unit 402 modifies the destination of the information request to the lower terminal device 6 connected to itself (S7), and acquires the terminal information from this lower terminal device 6 (S8), and stores the acquired terminal information (acquired data) in the buffer unit 407 (S9). In other words, the information acquisition unit 402 performs the first reply process.

After the lower superimposing apparatus 4 stores the terminal information (data) in the buffer unit 407, next time the lower superimposing apparatus 4 receives the information request directed to the lower terminal device 6 connected to itself (S2: Yes), the lower superimposing apparatus 4 returns the terminal information (stored data) in the buffer unit 407 to the upper terminal device 5 via the communication unit 403 as a response to the information request (S10). In other words, the information acquisition unit 402 performs the second reply process.

For example, in the collection process, the upper terminal device 5 transmits the information request (hereinafter, referred to as "first information request") including the destination information representing the lower terminal device 61, the information request (hereinafter, referred to as "second information request") including the destination information representing the lower terminal device 62, and the information request (hereinafter, referred to as "third information request") including the destination information representing the lower terminal device 63 at predetermined time intervals in this order.

Upon receiving the first information request, the upper superimposing apparatus 3 transmits the first information request to the lower superimposing apparatuses 41, 42, and 43 by use of the superimposed signal. Upon receiving the first information request (S1), the respective lower superimposing apparatuses 41, 42, and 43 perform the destination judgment process (S2). The destination information of the first information request represents the lower terminal device 61. Thus, the lower superimposing apparatus 41 performs the acquisition judgment process (S3) and the remaining lower superimposing apparatuses 42 and 43 perform the reception judgment process (S6). When the buffer unit 407 of the lower superimposing apparatus 41 does not store the terminal information, the lower superimposing apparatus 41 performs the third reply process (S4 and S5). As a result, the terminal information of the lower terminal device 61 is transmitted to the upper superimposing apparatus 3 as the superimposed signal. Upon receiving the terminal information of the lower terminal device 61, the upper superimposing apparatus 3 transmits the received terminal information of the lower terminal device 61 to the upper terminal device 5. With regard to the lower superimposing apparatuses 42 and 43, since the first information request is the first of the information requests in the collection process, the respective lower superimposing apparatuses 42 and 43 perform the first reply process (S7, S8, and S9). As a result, the buffer unit 407 of the lower superimposing apparatus 42 stores the terminal information of the lower terminal device 62, and the buffer unit 407 of the lower superimposing apparatus 43 stores the terminal information of the lower terminal device 63.

Upon receiving the second information request, the upper superimposing apparatus 3 transmits the second information request to the lower superimposing apparatuses 41, 42, and 43 by use of the superimposed signal. Upon receiving the second information request (S1), the respective lower superimposing apparatuses 41, 42, and 43 perform the destination judgment process (S2). The destination information of the second information request represents the lower terminal device 62. Thus, the lower superimposing apparatus 42 performs the acquisition judgment process (S3) and the remaining lower superimposing apparatuses 41 and 43 perform the reception judgment process (S6). Since the buffer unit 407 of the lower superimposing apparatus 42 has already stored the terminal information of the lower terminal device 62, the lower superimposing apparatus 42 performs the second reply process (S10). As a result, the terminal information of the lower terminal device 62 is transmitted to the upper superimposing apparatus 3 as the superimposed signal. Upon receiving the terminal information of the lower terminal device 62, the upper superimposing apparatus 3 transmits the received terminal information of the lower terminal device 62 to the upper terminal device 5. With regard to the lower superimposing apparatuses 41 and 43, since the second information request is the second of the information requests in the collection process, the respective lower superimposing apparatuses 41 and 43 terminate the procedure without performing the first reply process.

Upon receiving the third information request, the upper superimposing apparatus 3 transmits the third information request to the lower superimposing apparatuses 41, 42, and 43 by use of the superimposed signal. Upon receiving the third information request (S1), the respective lower superimposing apparatuses 41, 42, and 43 perform the destination judgment process (S2). The destination information of the third information request represents the lower terminal device 63. Thus, the lower superimposing apparatus 43 performs the acquisition judgment process (S3) and the remaining lower superimposing apparatuses 41 and 42 perform the reception judgment process (S6). Since the buffer unit 407 of the lower superimposing apparatus 43 has already stored the terminal information of the lower terminal device 63, the lower superimposing apparatus 43 performs the second reply process (S10). As a result, the terminal information of the lower terminal device 63 is transmitted to the upper superimposing apparatus 3 as the superimposed signal. Upon receiving the terminal information of the lower terminal device 63, the upper superimposing apparatus 3 transmits the received terminal information of the lower terminal device 63 to the upper terminal device 5. With regard to the lower superimposing apparatuses 41 and 42, since the second information request is the third of the information requests in the collection process, the respective lower superimposing apparatuses 41 and 42 terminate the procedure without performing the first reply process.

In this manner, the second terminal device 5 obtains the terminal information of the respective first terminal devices 61, 62, and 63 by performing the collection process.

As mentioned in the above, the communication system of the present embodiment is a communication system which includes a plurality of the terminal devices 5 and 6, and is designed to share the transmission path 2 with a system employing the first protocol communication using the transmission signal repeatedly transmitted and to allow the terminal devices 5 and 6 to transfer the terminal information to each other by use of the second protocol communication transmitting the superimposed signal superimposed in the predetermined superimposable period of the transmission signal. The communication system includes the lower superimposing apparatus 4 and the upper superimposing apparatus 3. The lower superimposing apparatus 4 is interposed between the transmission path 2 and the terminal device (lower terminal device) 6 serving as a sender of the terminal information. The lower superimposing apparatus 4 converts the terminal information outputted from the terminal device 6 into the superimposed signal and sends the superimposed signal to the transmission path 2. The upper terminal device 5 is interposed between the transmission path 2 and the terminal device (upper terminal device) 5 serving as a receiver of the terminal information. The upper terminal device 5 converts the superimposed signal received from the transmission path 2 into the terminal information and outputs the terminal information to the terminal device 5. The lower superimposing apparatus 4 includes the terminal connection unit 401, the information acquisition unit 402, the buffer unit 407, and the communication unit 403. The terminal connection unit 401 is connected to the terminal device 6. The information acquisition unit 402 acquires the terminal information from the terminal device 6 connected to the terminal connection unit 401. The buffer unit 407 stores the terminal information acquired by the information acquisition unit 402. The communication unit 403 returns the terminal information by use of the superimposed signal in response to the information request from the upper superimposing apparatus 3. The information acquisition unit 402 acquires the terminal information at a designated timing, and temporarily stores the terminal information in the buffer unit 407 until receiving the information request to the terminal device 6 connected to the terminal connection unit 401.

In other words, the communication system of the present embodiment includes a plurality of the first terminal devices (lower terminal devices) 6, the second terminal device (upper terminal device) 5, the first superimposing apparatus (lower superimposing apparatus) 4, and the second superimposing apparatus (upper superimposing apparatus) 3. Each of the first terminal devices 6 is connected to the transmission path 2 and has predetermined terminal information. The second terminal device 5 is connected to the transmission path 2 and is configured to send the information request for requesting the first terminal device 6 to provide the terminal information thereof. The first superimposing apparatus 4 is interposed between the first terminal device 6 and the transmission path 2. The second superimposing apparatus 3 is interposed between the second terminal device 5 and the transmission path 2 and is configured to receive the information request from the second terminal device 5. The first superimposing apparatus 4 includes the first terminal connection unit 401, the first communication unit 403, the information acquisition unit 402, and the buffer unit 407. The first terminal connection unit 401 is used for making connection with the first terminal device 6. The first communication unit 403 is connected to the transmission path 2 and is configured to communicate with the second superimposing apparatus 3 in the available period in which the transmission path 2 is available. The information acquisition unit 402 is configured to acquire the terminal information from the first terminal device 6 connected to the first terminal connection unit 401 at a predetermined timing. The buffer unit 407 is configured to store therein the terminal information acquired by the information acquisition unit 402. The second superimposing apparatus 3 is configured to, upon receiving the information request from the second terminal device 5, send the information request to the first superimposing apparatus 4 in the available period. The information acquisition unit 402 is configured to, upon receiving the information request from the second superimposing apparatus 3 via the first communication unit 403, retrieve the terminal information from the buffer unit 407 and send the retrieved terminal information to the second superimposing apparatus 3 via the first communication unit 403. The second superimposing apparatus 3 is configured to, upon receiving the terminal information, provide the received terminal information to the second terminal device 5.

Especially, in the communication system of the present embodiment, the transmission path 2 is used for transmission of the transmission signal based on the communication protocol different from the communication protocol between the first superimposing apparatus 4 and the second superimposing apparatus 3. The available period is defined as a period in which the superimposed signal is allowed to be superimposed on the transmission signal 2. The communication unit (first communication unit) 403 is configured to communicate with the second superimposing apparatus 3 by use of the superimposed signal. The second superimposing apparatus 3 is configured to send the information request to the first superimposing apparatus 4 using the superimposing signal.

The superimposing apparatus 4 in the present embodiment is used in a communication system which includes a plurality of the terminal devices 5 and 6, and is designed to share the transmission path 2 with a system employing the first protocol communication using the transmission signal repeatedly transmitted, and to allow the terminal devices 5 and 6 to transfer the terminal information to each other by use of the second protocol communication transmitting the superimposed signal superimposed in the predetermined superimposable period of the transmission signal. The communication system includes the lower superimposing apparatus 4 and the upper superimposing apparatus 3. The lower superimposing apparatus 4 is interposed between the transmission path 2 and the terminal device (lower terminal device) 6 serving as a sender of the terminal information. The lower superimposing apparatus 4 converts the terminal information outputted from the terminal device 6 into the superimposed signal and sends the superimposed signal to the transmission path 2. The upper terminal device 5 is interposed between the transmission path 2 and the terminal device (upper terminal device) 5 serving as a receiver of the terminal information. The upper terminal device 5 converts the superimposed signal received from the transmission path 2 into the terminal information and outputs the terminal information to the terminal device 5. The superimposing apparatus 4 in the present embodiment is used as the lower superimposing apparatus 4 in this communication system, and includes the terminal connection unit 401, the information acquisition unit 402, the buffer unit 407, and the communication unit 403. The terminal connection unit 401 is connected to the terminal device 6. The information acquisition unit 402 acquires the terminal information from the terminal device 6 connected to the terminal connection unit 401. The buffer unit 407 stores the terminal information acquired by the information acquisition unit 402. The communication unit 403 returns the terminal information by use of the superimposed signal in response to the information request from the upper superimposing apparatus 3. The information acquisition unit 402 acquires the terminal information at a designated timing, and temporarily stores the terminal information in the buffer unit 407 until receiving the information request to the terminal device 6 connected to the terminal connection unit 401.

In other words, the superimposing apparatus 4 of the present embodiment includes the terminal connection unit (first terminal connection unit) 401, the communication unit (first communication unit) 403, the information acquisition unit 402, and the buffer unit 407. The terminal connection unit 401 is used for making connection with the terminal device (first terminal device) 6 having predetermined terminal information. The communication unit 403 is connected to the transmission path 2 and is configured to make communication in the available period in which the transmission path 2 is available. The information acquisition unit 402 is configured to acquire the terminal information from the terminal device 6 connected to the terminal connection unit 401 at a predetermined timing. The buffer unit 407 is configured to store therein the terminal information acquired by the information acquisition unit 402. The information acquisition unit 402 is configured to, upon receiving an information request for requesting the terminal device 6 to provide the terminal information thereof via the communication unit 403, retrieve the terminal information from the buffer unit 407 and send the retrieved terminal information to the transmission path 2 via the communication unit 403.

According to the configuration of the present embodiment as explained in the above, the lower superimposing apparatus 4 acquires the terminal information by the information acquisition unit 402 at a designated timing, and temporarily stores the terminal information in the buffer unit 407 until receiving the information request to the terminal device 6 connected to the terminal connection unit 401. Hence, the multiple lower superimposing apparatuses 4 can simultaneously acquire the terminal information of the corresponding lower terminal devices 6 at a designated timing and store the terminal information in the respective buffer units 407 if needed. Since the communication between the upper superimposing apparatus 3 and the lower superimposing apparatus 4 is not allowed to be performed except a predetermined superimposable period, timings of returning the terminal information to the upper terminal device 5 may be different. However, the information acquisition unit 402 can preliminarily acquire the terminal information in advance of return of the terminal information.

Therefore, the information acquisition units 402 of the respective lower superimposing apparatuses 4 can acquire the terminal information at the same timing with regard to the lower terminal devices 61, 62, and 63. Accordingly, the communication system can reduce a time lag which would occur between the acquired times of the terminal information due to variations in timings of acquisition of the terminal information from the lower terminal devices 6 by the lower superimposing apparatuses 4. In brief, there is an advantage in that it is possible to reduce a time lag between the terminal information of the respective terminal devices 6 due to variations in timings of acquisition of the terminal information.

Further, in the present embodiment, the information acquisition unit 402 acquires the terminal information at a timing designated by a trigger from another device connected to the transmission path 2. In brief, since the timing at which the information acquisition unit 402 acquires the terminal information is designated by the trigger from another device connected to the transmission path 2, acquisition timings of the terminal information of the multiple lower superimposing apparatuses 4 connected to the transmission path 2 can easily coincide with each other. Moreover, the trigger is the information request from the upper superimposing apparatus 3. In this manner, since the information request from the upper superimposing apparatus 3 is used as the trigger, there is no need to add another device for generating the trigger. Thus, the system configuration can be simplified.

Furthermore, in the communication system of the present embodiment, a plurality of the lower superimposing apparatuses 4 is connected to the transmission path 2. When the lower superimposing apparatus 4 receives the information request destined to the terminal device 6 connected to the other lower superimposing apparatus 4, the information acquisition unit 402 acquires the terminal information from the terminal device 6 connected to the terminal connection unit 401 and stores the acquired terminal information in the buffer unit 407. When the lower superimposing apparatus 4 receives the information request destined to the terminal device 6 connected to its own terminal connection unit 401, the communication unit 403 returns the terminal information stored in the buffer unit 407.

In more specifically, the communication system of the present embodiment further includes a plurality of the first superimposing apparatuses 4 (41, 42, and 43). The information request includes destination information indicative of the first terminal device 6 which the second terminal device 5 requests to provide the terminal information. The information acquisition unit 402 is configured to perform the destination judgment process, the acquisition judgment process, the first reply process, the second reply process, and the third reply process. The information acquisition unit 402 is configured to, upon receiving the information request from the upper superimposing apparatus 3 via the first communication unit 403, perform the destination judgment process. The information acquisition unit 402 is configured to, in the destination judgment process, judge whether or not the lower terminal device (first terminal device) 6 indicated by the destination information is identical to the lower terminal device (first terminal device) 6 connected to the first terminal connection unit 401. The information acquisition unit 402 is configured to, upon concluding that the lower terminal device (first terminal device) 6 indicated by the destination information is identical to the lower terminal device (first terminal device) 6 connected to the first terminal connection unit 401 through the destination judgment process, perform the acquisition judgment process, and to, upon concluding that the lower terminal device (first terminal device) 6 indicated by the destination information is not identical to the lower terminal device (first terminal device) 6 connected to the first terminal connection unit 401 through the destination judgment process, perform the first reply process. The information acquisition unit 402 is configured to, in the acquisition judgment process, judge whether or not the terminal information of the lower terminal device (first terminal device) 6 indicated by the destination information is stored in the buffer unit 407. The information acquisition unit 402 is configured to, upon concluding that the terminal information of the lower terminal device (first terminal device) 6 indicated by the destination information is stored in the buffer unit 407 through the acquisition judgment process, perform the second reply process, and to, upon concluding that the terminal information of the lower terminal device (first terminal device) 6 indicated by the destination information is not stored in the buffer unit 407 through the acquisition judgment process, perform the third reply process. The information acquisition unit 402 is configured to, in the first reply process, acquire the terminal information from the lower terminal device (first terminal device) 6 connected to the first terminal connection unit 401. The information acquisition unit 402 is configured to, in the second reply process, retrieve the terminal information of the lower terminal device (first terminal device) 6 indicated by the destination information from the buffer unit 407 and send the retrieved terminal information to the upper superimposing apparatus (second superimposing apparatus) 3 via the first communication unit 403. The information acquisition unit 402 is configured to, in the third reply process, acquire the terminal information from the lower terminal device (first terminal device) 6 connected to the first terminal connection unit 401, and send the acquired terminal information to the upper superimposing apparatus (second superimposing apparatus) 3 via the first communication unit 403.

Accordingly, when the lower superimposing apparatus 4 receives the information request directed to the lower terminal device 6 connected to another lower superimposing apparatus 4, the lower superimposing apparatus 4 acquires the terminal information and temporarily stores the acquired terminal information in the buffer unit 407. Subsequently, the lower superimposing apparatus 4 sends the terminal information in response to the information request directed to the lower terminal device 6 connected to itself. Therefore, even when the information request is sent from the upper terminal device 5 acting as a master to a plurality of the lower terminal devices 6 acting as slaves sequentially, the information acquisition units 402 of the respective lower superimposing apparatuses 4 can have the same acquisition timing of the terminal information.

In addition, even when the information acquisition unit 402 receives a series of the information requests which are sequentially sent to the lower superimposing apparatuses 4 in order to request the terminal information obtained at the same timing, the information acquisition unit 402 acquires the terminal information from the terminal device 6 only one time.

In more specifically, the second terminal device 5 is configured to perform the collection process of sending in turn the information request to the first terminal devices 6. The information request sent in the collection process includes the identification information commonly assigned. The information acquisition unit 402 is configured to perform the reception judgment process of judging whether or not the information acquisition unit 402 has already received the information request including the identification information identical to the identification information included in the currently received information request. The information acquisition unit 402 is configured to, upon concluding that the information acquisition unit 402 has already received the information request including the same identification information as the currently received information request through the reception judgment process, not perform the first reply process. The information acquisition unit 402 is configured to, upon concluding that the information acquisition unit 402 has not yet received the information request including the same identification information as the currently received information request through the reception judgment process, perform the first reply process.

In brief, with regard to a series of the information requests for requesting the terminal information obtained at the same timing, the information acquisition unit 402 acquires the terminal information only one time. Therefore, differently from an instance where the information acquisition unit 402 considers, as the trigger, each of the serial information requests for requesting the terminal information obtained at the same timing, the information acquisition unit 402 does not acquire the terminal information at different timings from the same lower terminal device 6. Thus, the information acquisition unit 402 can acquire the terminal information at a single timing requested by the upper terminal device 5. Hence, there is an advantage in that acquisition of the unnecessary terminal information can be avoided.

Note that, the upper superimposing apparatus 3 may be configured to send a preliminary request in addition to the information request to all the lower superimposing apparatuses 4 connected to the transmission path 2, and the information acquisition unit 402 may be configured to acquire the terminal information from the lower terminal device 6 when receiving the preliminary request. The preliminary request is defined as a signal which is sent prior to the information request in order to request only acquisition of the terminal information. The preliminary request is broadcast to all the lower superimposing apparatuses 4. In this arrangement, upon receiving the preliminary request as the trigger, the information acquisition unit 402 acquires the terminal information and temporarily stores the acquired terminal information in the buffer unit 407. The information acquisition unit 402 sends the terminal information stored in the buffer unit 407 via the communication unit 403 in response to the subsequent information request.

Alternatively, the information acquisition unit 402 is not limited to a configuration that the information acquisition unit 402 acquires the terminal information in response to the trigger from another device connected to the transmission path 2. For example, the lower superimposing apparatus 4 may incorporate a clock therein and the information acquisition unit 402 may be configured to acquire the terminal information when time indicated by the clock is identical to a predetermined time. In other words, in a modification of the communication system of the present embodiment, the information acquisition unit 402 is configured to perform a regular acquisition process of acquiring the terminal information from the first terminal device 6 connected to the first terminal connection unit 401 at a predetermined time. In this modification, to synchronize the clocks of the plural lower superimposing apparatuses 4 with each other, the upper terminal device 5 may be configured to send a synchronizing signal periodically, for example.

Figure 6:
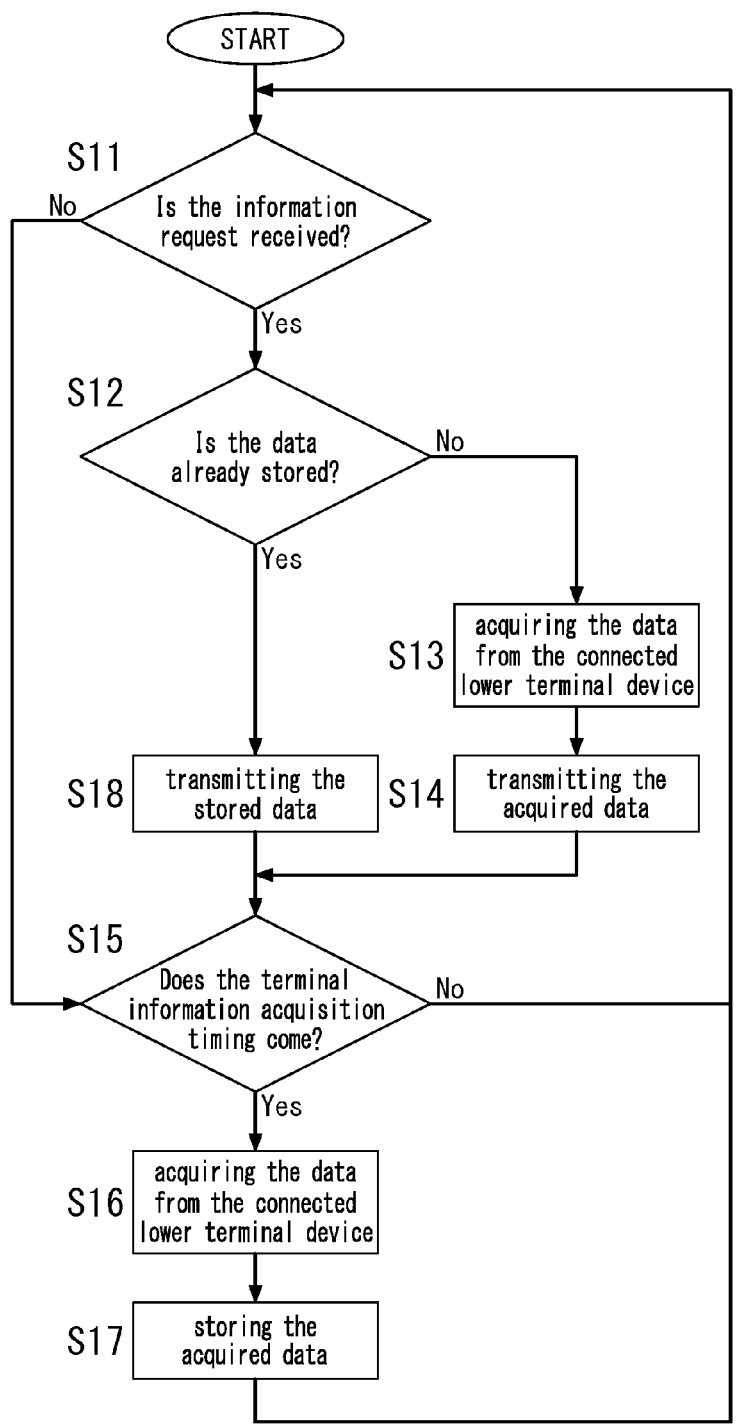
FIG. 6 is a flowchart illustrating the operation of the modification of the communication system of the first embodiment.

In this situation, when the information request is sent from the upper superimposing apparatus 3 at the predetermined time, the lower superimposing apparatus 4 operates in accordance with the flowchart illustrated in FIG. 6.

When the lower superimposing apparatus 4 receives the information request directed to the lower terminal device 6 connected to itself from the upper terminal device 5 (S11: Yes), the lower superimposing apparatus 4 judges whether or not the acquired terminal information (data) has been already stored in the buffer unit 407 (S12). When the terminal information (data) is not stored in the buffer unit 407 (S12: No), the information acquisition unit 402 acquires the terminal information (data) from the connected lower terminal device 6 (S13), and returns this terminal information (acquired data) to the upper terminal device 5 via the communication unit 403 as a response to the information request (S14).

In contrast, until the lower superimposing apparatus 4 receives the information request directed to the lower terminal device 6 connected to itself (S11: No), each time the time is identical to the predetermined time (515: Yes), the lower superimposing apparatus 4 acquires the terminal information from the lower terminal device 6 (516) and stores the acquired terminal information in the buffer unit 407 (S17). In brief, the lower superimposing apparatus 4 performs the regular acquisition process. After the lower superimposing apparatus 4 stores the terminal information in the buffer unit 407, when the lower superimposing apparatus 4 receives the information request directed to the lower terminal device 6 connected to itself (S11: Yes), the lower superimposing apparatus 4 returns the terminal information stored in the buffer unit 407 to the upper terminal device 5 via the communication unit 403 as a response to the information request (S18).

Also in this modification, like the above embodiment (the instance illustrated in FIG. 5), the plural lower superimposing apparatuses 4 acquire the terminal information of the lower terminal device 6 at a designated timing (the predetermined time) simultaneously. Thus, it is possible to reduce a time lag between the terminal information.

Second Embodiment

Figure 7:
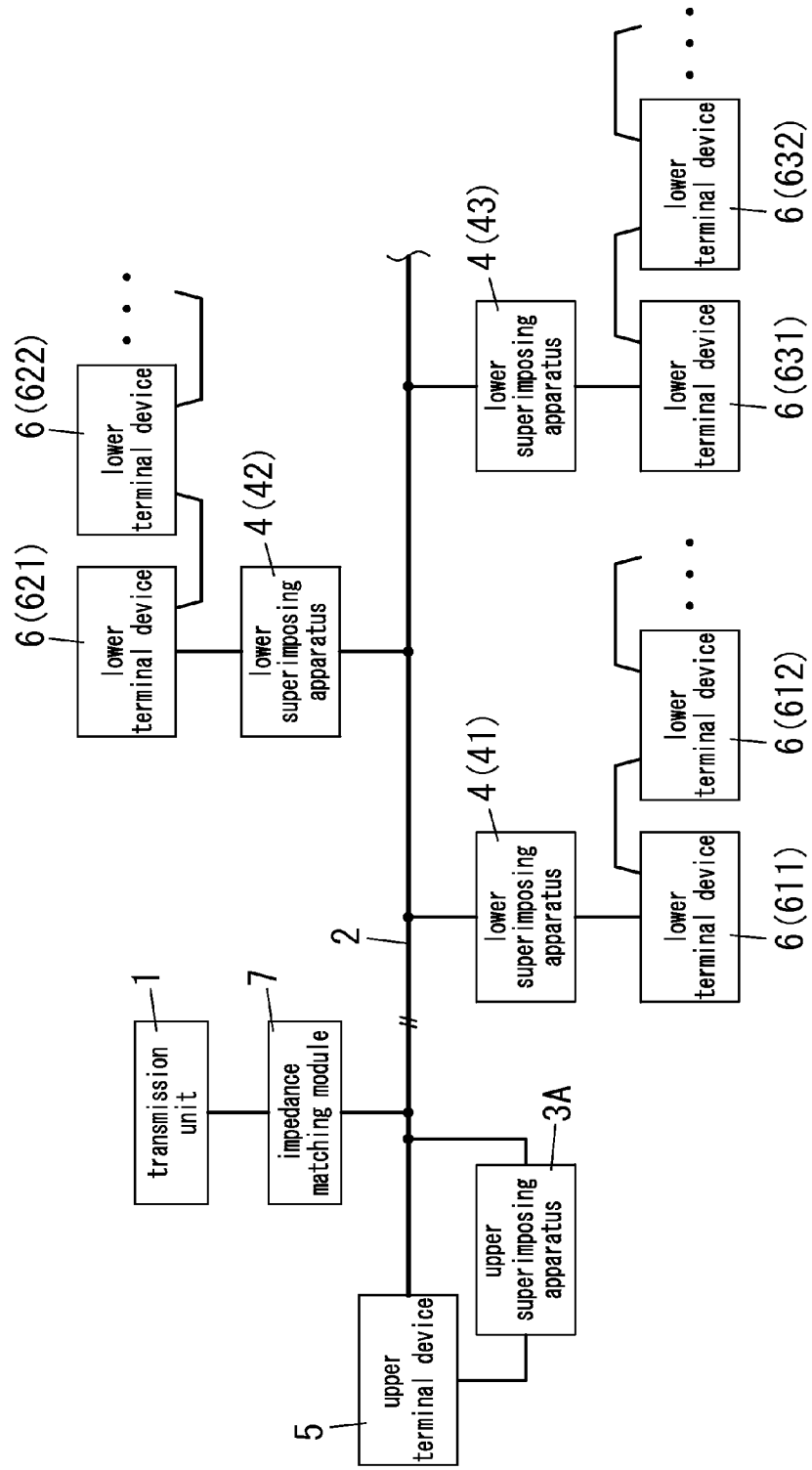
FIG. 7 is a schematic diagram illustrating the communication system of the second embodiment.
Figure 8:
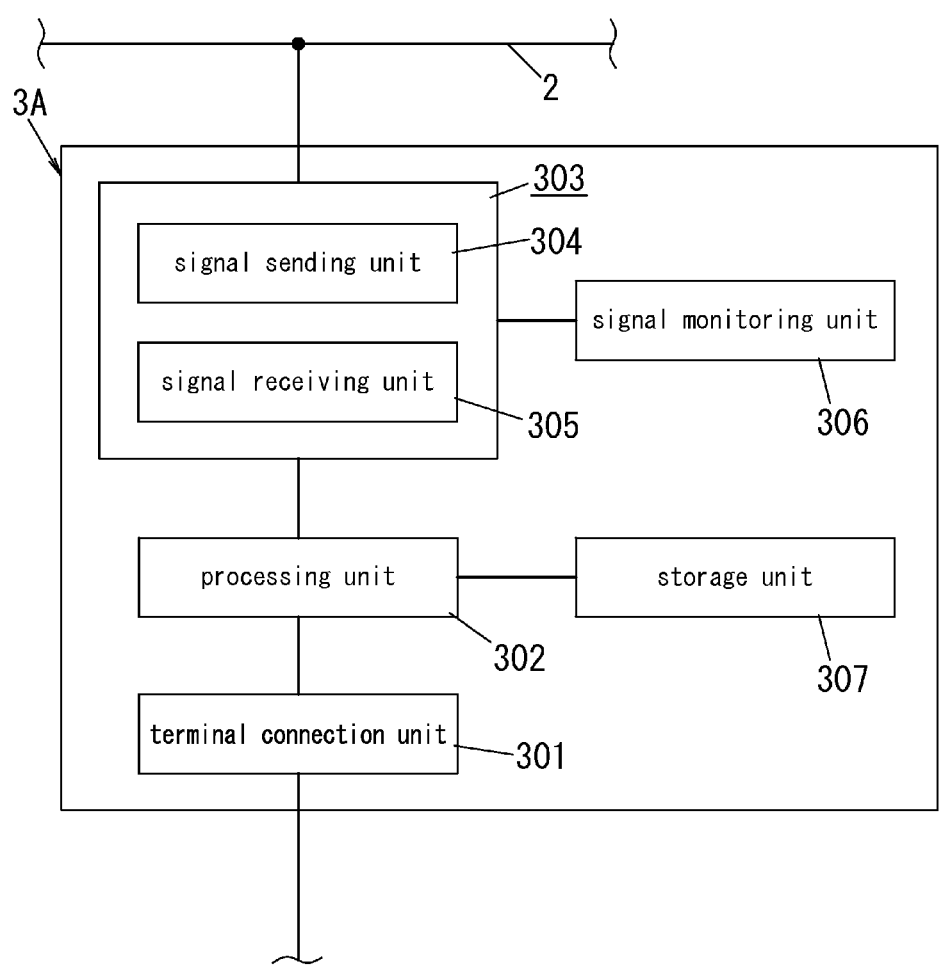
FIG. 8 is a block diagram illustrating the upper superimposing apparatus of the communication system of the second embodiment.

As shown in FIG. 7, the communication system of the present embodiment is different from the communication system of embodiment 1 in that a plurality of the lower terminal devices 6 is connected to each of the lower superimposing apparatuses 4. In brief, in the communication system of the present embodiment, a plurality of the first terminal devices 6 is connected to the first terminal connection unit 401. Further, as shown in FIG. 8, the communication system of the present embodiment is different from the communication system of embodiment 1 in that the upper superimposing apparatus (second superimposing apparatus) 3A includes a storage unit 307.

In the instance illustrated in FIG. 7, the lower terminal devices 611, 612, etc. are connected to the lower superimposing apparatus 41, and the lower terminal devices 621, 622, etc. are connected to the lower superimposing apparatus 42, and the lower terminal devices 631, 632, etc. are connected to the lower superimposing apparatus 43. The plural lower terminal devices 6 connected to the same lower superimposing apparatus 4 are connected via an extended line in such a manner to be connected in parallel with the terminal connection unit 401.

In the present embodiment, upon receiving the information request from the upper superimposing apparatus 3A as the trigger, the information acquisition unit 402 acquires the terminal information from all the lower terminal devices 6 connected to the terminal connection unit 401 and temporarily stores the acquired terminal information in the buffer unit 407. In brief, the information acquisition unit 402 is configured to acquire the terminal information from the respective first terminal devices 6 connected to the terminal connection unit 401 at the predetermined timing. In the present embodiment, the information acquisition unit 402 acquires the terminal information in response to the first of the serial information requests for requesting return of the terminal information acquired at the same timing. Hence, the information acquisition unit 402 does not acquire the terminal information from the same lower terminal device 6 redundantly in response to the series of the information requests.

When the buffer unit 407 has already stored the terminal information identical to the terminal information requested by the information request outputted from the upper terminal device 5, the lower superimposing apparatus 4 does not newly acquire the terminal information from the lower terminal device 6 but sends the stored terminal information to the upper superimposing apparatus 3A via the communication unit 403 as a response to the information request.

In the present embodiment, the information acquisition unit 402 of each of the lower terminal devices 4 outputs one by one the information request to the plural lower terminal devices 6 connected to the terminal connection unit 401, and then acquires the terminal information as a reply of the information request. Note that, differently from the second protocol communication, a period in which communication between the lower superimposing apparatus 4 and the lower terminal device 6 is allowed is not limited to the predetermined superimposable period. Thus, a time difference of acquisition time of the terminal information by the information acquisition unit 402 between the plural lower terminal devices 6 is negligible. Consequently, there is no significant time lag between the terminal information acquired from the plural lower terminal devices 6 by the information acquisition unit 402.

Further, in the present embodiment, when the lower superimposing apparatus 4 returns the terminal information in response to receiving the information request directed to the lower terminal device 6 connected to itself from the upper superimposing apparatus 3A, the lower superimposing apparatus 4 sends the terminal information of all the lower terminal devices 6 preliminarily stored in the buffer unit 407 to the upper superimposing apparatus 3 via the communication unit 403.

As shown in FIG. 8, the upper superimposing apparatus 3A includes the storage unit 307 for storing the terminal information. The upper superimposing apparatus 3A temporarily stores in the storage unit 307 the terminal information of the plural lower terminal devices 6 simultaneously sent from the lower superimposing apparatus 4. In this situation, the upper superimposing apparatus 3A returns to the upper terminal device 5 only the terminal information of the lower terminal device 6 which is the destination of the information request outputted by the upper terminal device 5.

In brief, the second superimposing apparatus 3A includes the storage unit 307 configured to store the terminal information received from the first superimposing apparatus 4.

The processing unit 302 is configured to, upon receiving the information request from the second terminal device 5, judge whether or not the storage unit 307 has stored the terminal information corresponding to the first terminal device 6 represented by the destination information included in the received information request.

The processing unit 302 is configured to, when the storage unit 307 has stored the terminal information corresponding to the first terminal device 6 represented by the destination information, retrieve the terminal information corresponding to the first terminal device 6 represented by the destination information from the storage unit 307 and send it to the second terminal device 5.

The processing unit 302 is configured to, when the storage unit 307 has not yet stored the terminal information corresponding to the first terminal device 6 represented by the destination information, transmit the information request to the first superimposing apparatus 4 via the second communication unit 303. In the present embodiment, the information acquisition unit 402 transmits the terminal information of all the first terminal devices 6 connected to the first terminal connection unit 401 to the upper superimposing apparatus 3. Therefore, the processing unit 302 is configured to transmit to the upper terminal device 5 only the terminal information corresponding to the first terminal device 6 indicated by the destination information included in the information request received from the upper terminal device 5 out of the terminal information received via the second communication unit.

Subsequently, when the storage unit 307 has already stored the terminal information requested by the information request outputted from the upper terminal device 5, the upper superimposing apparatus 3A does not communicate anew with the lower superimposing apparatus 4 but outputs the stored terminal information from the storage unit 307 to the upper terminal device 5 as a reply to the information request. The terminal information stored in the storage unit 307 is deleted from the storage unit 307 just after it is returned to the upper terminal device 5. Note that, it is not always necessary to delete the terminal information from the storage unit 307.

Figure 9:
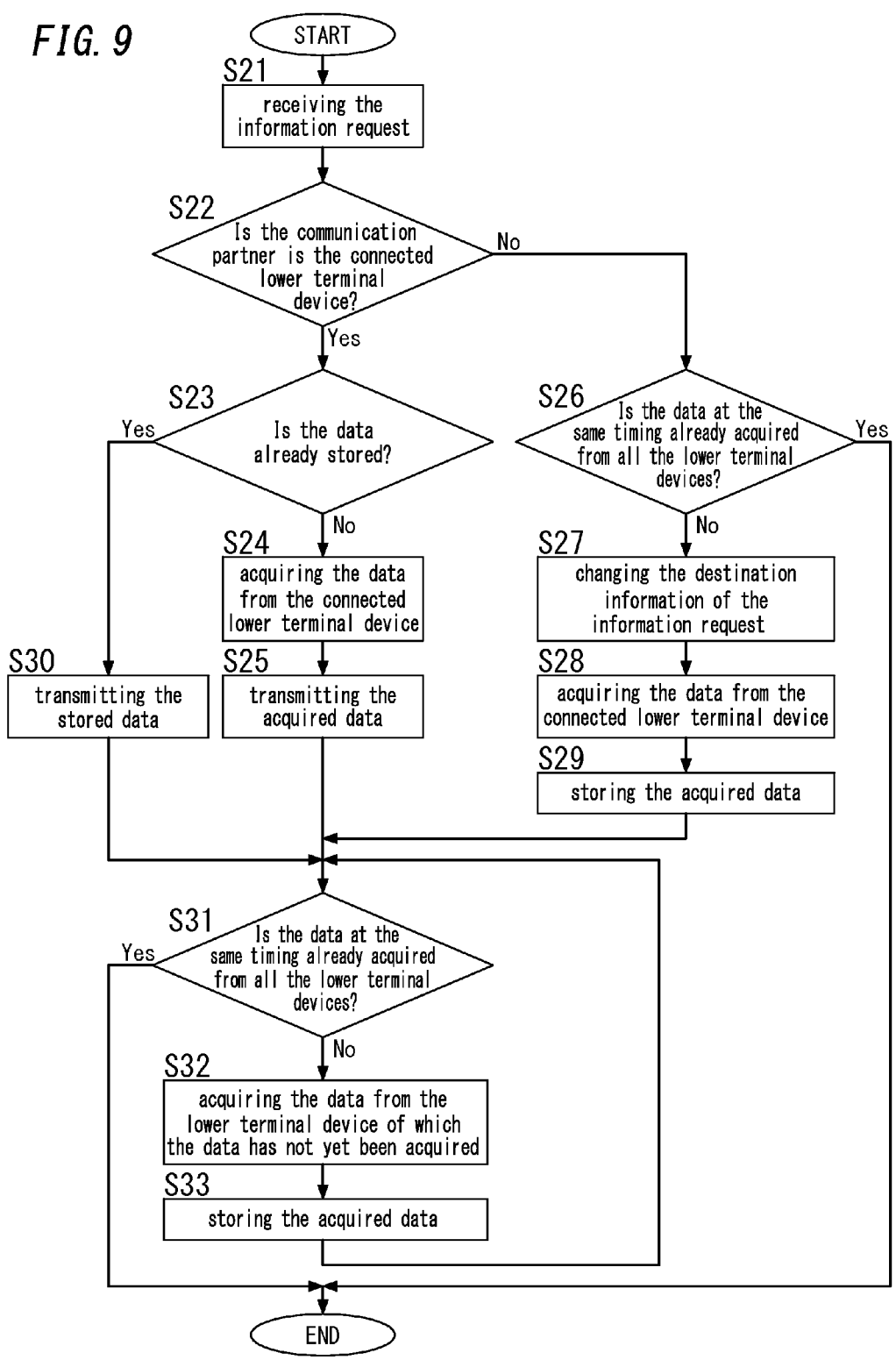
FIG. 9 is a flowchart illustrating the operation of the communication system of the second embodiment.

The following explanation referring to the flowchart illustrated in FIG. 9 is made to an operation of the lower superimposing apparatus 4 of the present embodiment.

The steps S21 to S30 in the flowchart of FIG. 9 are respectively corresponding to the steps S1 to S10 in the flowchart of FIG. 5. However, although in the step S6 in FIG. 5 whether or not the lower superimposing apparatus 4 has already acquired the terminal information at the same timing from the lower terminal device 6 is judged, in the step S26 in FIG. 9 whether or not the lower superimposing apparatus 4 has already acquired the terminal information at the same timing from all the lower terminal devices 6 is judged. Further, in the step S7 in FIG. 5, the information acquisition unit 402 modifies the destination of the information request to the lower terminal device 6 connected to itself. However, in the step S27 in FIG. 9, the information acquisition unit 402 modifies the destination of the information request to the lower terminal device 6 from which the information acquisition unit 402 has not yet acquired the terminal information, out of the plural lower terminal devices 6. Furthermore, in the steps S25 and S30 in FIG. 9, the terminal information returned by the communication unit 403 is replaced by the terminal information of the respective lower terminal devices 6 connected to the terminal connection unit 401.

In the instance shown in FIG. 9, when the terminal information is returned via the communication unit 403 (S25 and S30) or when the terminal information acquired by the information acquisition unit 402 is stored in the buffer unit 407 (S29), the lower superimposing apparatus 4 judges whether or not the lower superimposing apparatus 4 has received the terminal information at the same timing from all the lower terminal devices 6 (S31). When the lower superimposing apparatus 4 has already acquired the terminal information of all the lower terminal devices 6 (S31: Yes), the lower superimposing apparatus 4 terminates the procedure.

Meanwhile, when the lower superimposing apparatus 4 has not yet acquired the terminal information of all the lower terminal devices 6 (S31: No), the lower superimposing apparatus 4 repeats a process of acquiring the terminal information from the lower terminal device 6 from which the lower superimposing apparatus 4 has not yet acquired the terminal information (S32) and storing the acquired terminal information in the buffer unit 407 (S33), until the lower superimposing apparatus 4 has acquired the terminal information of all the lower terminal devices 6.

Figure 10:
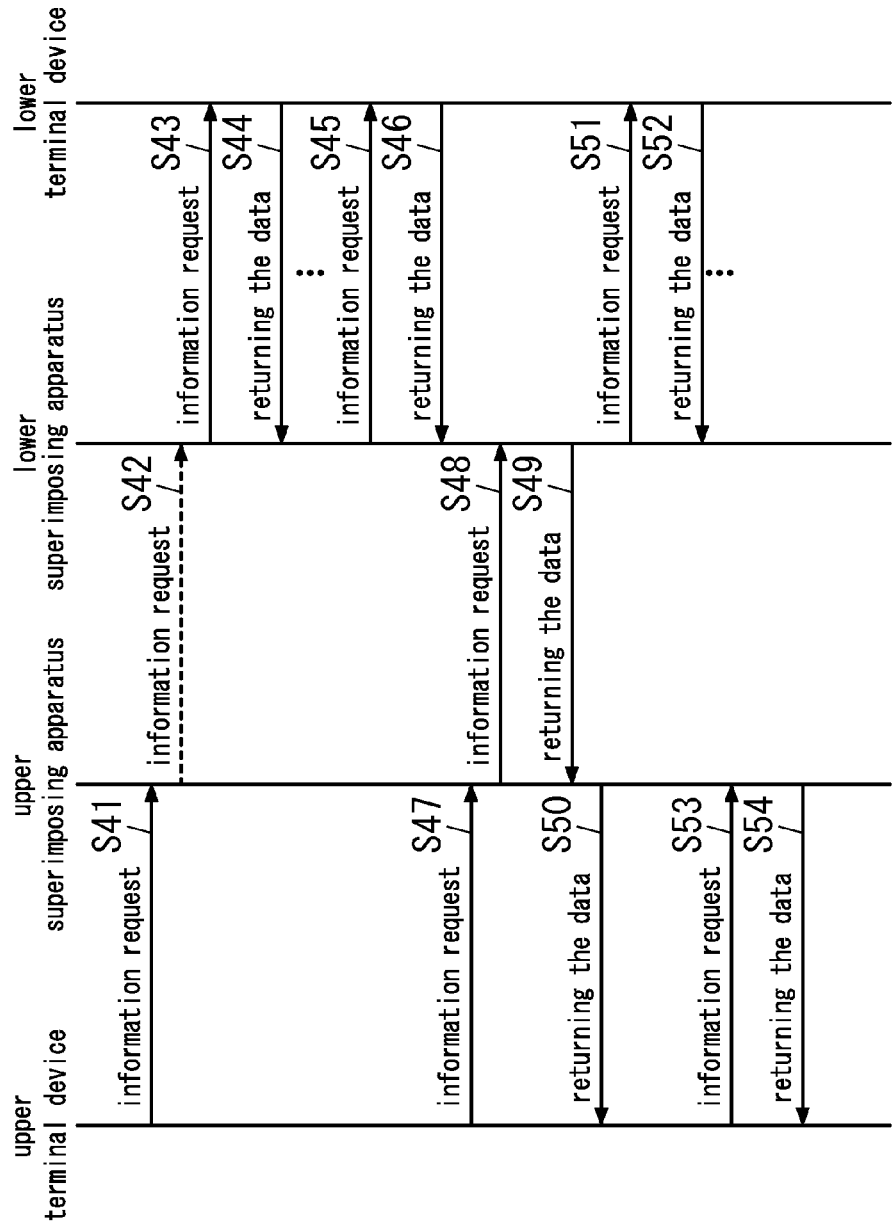
FIG. 10 is a sequence chart illustrating the operation of the communication system of the second embodiment.

The next explanation referring to the sequence chart illustrated in FIG. 10 is made to a specific operation instance of the communication system of the present embodiment. FIG. 10 shows transfers of information between the upper terminal device 5, the upper superimposing apparatus 3A, the lower superimposing apparatus 41, and the lower terminal devices 611, 612, etc. connected to the lower superimposing apparatus 41.

When the upper terminal device 5 outputs the information request (S41) to the lower terminal device 631 connected to the lower superimposing apparatus 43, the upper superimposing apparatus 3A also transmits the information request (S42) to the lower superimposing apparatus 41 via the superimposed signal. Upon receiving the information request directed to the lower terminal device 631, the lower superimposing apparatus 41 acknowledges the received information request as the trigger, and outputs the information request to the lower terminal devices 611, 612, etc. connected to itself, thereby starting the acquisition of the terminal information (S43 to S46). However, the lower superimposing apparatus 41 does not return the received terminal information to the upper superimposing apparatus 3 immediately but stores the received terminal information in the buffer unit 407. Consequently, the buffer unit 407 of the lower superimposing apparatus 3 stores the terminal information of the respective lower terminal devices 611, 612, etc.

Subsequently, when the upper terminal device 5 outputs the information request (S47) to the lower terminal device 611, the upper superimposing apparatus 3A transmits the information request (S48) to the lower superimposing apparatus 41 via the superimposed signal. Upon receiving the information request directed to the lower terminal device 611, the lower superimposing apparatus 41 returns all the terminal information stored in the buffer unit 407 to the upper superimposing apparatus 3A in response to the received information request (S49). In brief, the terminal information of the respective lower terminal devices 611, 612, etc. is transmitted to the upper superimposing apparatus 3A.

Upon receiving the terminal information from the lower superimposing apparatus 41, the upper superimposing apparatus 3A outputs only the terminal information of the lower terminal device 611 designated as the destination of the information request to the upper terminal device 5 (S50), and stores the remaining terminal information in the storage unit 307. Meanwhile, upon receiving the information request (S48), the lower superimposing apparatus 41 acknowledges the received information request as the trigger, and outputs the information request to the lower terminal devices 611, 612, etc. connected to itself, thereby starting the acquisition of the terminal information (S51 and S52).

Thereafter, when the upper terminal device 5 outputs the information request (S53) to the lower terminal device 612, the upper superimposing apparatus 3 does not anew establish communication, but returns the terminal information of the lower terminal device 612 stored in the storage unit to the upper terminal device 5 (S54).

For example, it is assumed that the two lower terminal devices 611 and 612 are connected to the lower superimposing apparatus 41 and the two lower terminal devices 621 and 622 are connected to the lower superimposing apparatus 42 and the two lower terminal devices 631 and 632 are connected to the lower superimposing apparatus 43. Further, in an initial state, the storage unit 307 stores no terminal information, and the buffer units 407 of the respective lower superimposing apparatuses 41, 42, and 43 store no terminal information.

Under this assumption, in the collection process, the upper terminal device 5 transmits the information request (hereinafter, referred to as "first information request") including the destination information representing the lower terminal device 611, the information request (hereinafter, referred to as "second information request") including the destination information representing the lower terminal device 612, the information request (hereinafter, referred to as "third information request") including the destination information representing the lower terminal device 621, the information request (hereinafter, referred to as "fourth information request") including the destination information representing the lower terminal device 622, the information request (hereinafter, referred to as "fifth information request") including the destination information representing the lower terminal device 631, and the information request (hereinafter, referred to as "sixth information request") including the destination information representing the lower terminal device 632, at predetermined time intervals in this order.

Upon receiving the first information request, the upper superimposing apparatus 3A judges whether or not the storage unit 307 has already stored the terminal information of the lower terminal device 611. Since the storage unit 307 has not yet stored any terminal information, the upper superimposing apparatus 3A transmits the first information request to the lower superimposing apparatuses 41, 42, and 43 through the superimposed signal. Upon receiving the first information request (S21), the respective lower superimposing apparatuses 41, 42, and 43 perform the destination judgment process (S22). The destination information of the first information request represents the lower terminal device 611. Thus, the lower superimposing apparatus 41 performs the acquisition judgment process (S23) and the remaining lower superimposing apparatuses 42 and 43 perform the reception judgment process (S26). Since the buffer unit 407 of the lower superimposing apparatus 41 has not yet stored the terminal information of the lower terminal device 611, the lower superimposing apparatus 41 performs the third reply process (S24 and S25). As a result, the terminal information of the lower terminal device 611 is transmitted to the upper superimposing apparatus 3 as the superimposed signal. Further, the lower superimposing apparatus 41 acquires the terminal information of the lower terminal devices 612 (S31, S32, and S33). Thus, the buffer unit 407 stores the terminal information of the respective two lower terminal devices 611 and 612. Upon receiving the terminal information of the lower terminal device 611, the upper superimposing apparatus 3A transmits the received terminal information of the lower terminal device 611 to the upper terminal device 5. With regard to the lower superimposing apparatuses 42 and 43, since the first information request is the first of the information requests in the collection process, the respective lower superimposing apparatuses 42 and 43 collect the terminal information (S27, S28, S29, S31, S32, and S33). As a result, the buffer unit 407 of the lower superimposing apparatus 42 stores the terminal information of the respective lower terminal devices 621 and 622, and the buffer unit 407 of the lower superimposing apparatus 43 stores the terminal information of the respective lower terminal devices 631 and 632.

Upon receiving the second information request, the upper superimposing apparatus 3A judges whether or not the storage unit 307 has already stored the terminal information of the lower terminal device 612. Since the storage unit 307 has not yet stored the terminal information of the lower terminal device 612, the upper superimposing apparatus 3A transmits the second information request to the lower superimposing apparatuses 41, 42, and 43 through the superimposed signal. Upon receiving the second information request (S21), the respective lower superimposing apparatuses 41, 42, and 43 perform the destination judgment process (S22). The destination information of the second information request represents the lower terminal device 612. Thus, the lower superimposing apparatus 41 performs the acquisition judgment process (S23) and the remaining lower superimposing apparatuses 42 and 43 perform the reception judgment process (S26). Since the buffer unit 407 of the lower superimposing apparatus 41 has already stored the terminal information of the lower terminal device 612, the lower superimposing apparatus 41 performs the second reply process (S30). As a result, the terminal information of the lower terminal device 612 is transmitted to the upper superimposing apparatus 3A together with the terminal information of the lower terminal device 611 by use of the superimposed signal. Upon receiving the terminal information of the respective lower terminal devices 611 and 612, the upper superimposing apparatus 3A transmits only the terminal information of the lower terminal device 612 corresponding to the destination information of the second information request to the upper terminal device 5. With regard to the lower superimposing apparatuses 42 and 43, since the second information request is the second of the information requests in the collection process, the respective lower superimposing apparatuses 42 and 43 terminate the procedures.

Upon receiving the third information request, the upper superimposing apparatus 3A judges whether or not the storage unit 307 has already stored the terminal information of the lower terminal device 621. Since the storage unit 307 has not yet stored the terminal information of the lower terminal device 621, the upper superimposing apparatus 3A transmits the third information request to the lower superimposing apparatuses 41, 42, and 43 through the superimposed signal. Upon receiving the third information request (S21), the respective lower superimposing apparatuses 41, 42, and 43 perform the destination judgment process (S22). The destination information of the third information request represents the lower terminal device 621. Thus, the lower superimposing apparatus 42 performs the acquisition judgment process (S23) and the remaining lower superimposing apparatuses 41 and 43 perform the reception judgment process (S26). Since the buffer unit 407 of the lower superimposing apparatus 42 has already stored the terminal information of the lower terminal device 621, the lower superimposing apparatus 42 performs the second reply process (S30). As a result, the terminal information of the lower terminal device 621 is transmitted to the upper superimposing apparatus 3A together with the terminal information of the lower terminal device 622 by use of the superimposed signal. Upon receiving the terminal information of the respective lower terminal devices 621 and 622, the upper superimposing apparatus 3A transmits only the terminal information of the lower terminal device 621 corresponding to the destination information of the third information request to the upper terminal device 5. Further, the storage unit 307 stores the terminal information of the lower terminal device 622. With regard to the lower superimposing apparatuses 41 and 43, since the third information request is the third of the information requests in the collection process, the respective lower superimposing apparatuses 41 and 43 terminate the procedures.

Upon receiving the fourth information request, the upper superimposing apparatus 3A judges whether or not the storage unit 307 has already stored the terminal information of the lower terminal device 622. Since the storage unit 307 has already stored the terminal information of the lower terminal device 622, the upper superimposing apparatus 3A transmits the terminal information of the lower terminal device 622 to the upper terminal device 5 and then terminates the procedure. Consequently, the fourth request is not transmitted to the lower superimposing apparatuses 41, 42, and 43.

Upon receiving the fifth information request, the upper superimposing apparatus 3A judges whether or not the storage unit 307 has already stored the terminal information of the lower terminal device 631. Since the storage unit 307 has not yet stored the terminal information of the lower terminal device 631, the upper superimposing apparatus 3A transmits the fifth information request to the lower superimposing apparatuses 41, 42, and 43 through the superimposed signal. Upon receiving the fifth information request (S21), the respective lower superimposing apparatuses 41, 42, and 43 perform the destination judgment process (S22). The destination information of the fifth information request represents the lower terminal device 631. Thus, the lower superimposing apparatus 43 performs the acquisition judgment process (S23) and the remaining lower superimposing apparatuses 41 and 42 perform the reception judgment process (S26). Since the buffer unit 407 of the lower superimposing apparatus 43 has already stored the terminal information of the lower terminal device 631, the lower superimposing apparatus 43 performs the second reply process (S30). As a result, the terminal information of the lower terminal device 631 is transmitted to the upper superimposing apparatus 3A together with the terminal information of the lower terminal device 632 by use of the superimposed signal. Upon receiving the terminal information of the respective lower terminal devices 631 and 632, the upper superimposing apparatus 3A transmits only the terminal information of the lower terminal device 631 corresponding to the destination information of the fifth information request to the upper terminal device 5. Further, the storage unit 307 stores the terminal information of the lower terminal device 632. With regard to the lower superimposing apparatuses 41 and 42, since the fifth information request is the fifth of the information requests in the collection process, the respective lower superimposing apparatuses 41 and 42 terminate the procedures.

Upon receiving the sixth information request, the upper superimposing apparatus 3A judges whether or not the storage unit 307 has already stored the terminal information of the lower terminal device 632. Since the storage unit 307 has already stored the terminal information of the lower terminal device 632, the upper superimposing apparatus 3A transmits the terminal information of the lower terminal device 632 to the upper terminal device 5 and then terminates the procedure. Consequently, the sixth request is not transmitted to the lower superimposing apparatuses 41, 42, and 43.

In this manner, the upper terminal device 5 obtains the terminal information of the respective lower terminal devices 611, 612, 621, 622, 631, and 632 by performing the collection process.

In the aforementioned communication system of the present embodiment, a plurality of the terminal devices 6 is connected to a single lower superimposing apparatus 4. The information acquisition unit 402 acquires the terminal information from all the terminal devices 6 connected to the terminal connection unit 401 at a designated timing and stores the acquired terminal information in the buffer unit 407.

In other words, in the communication system of the present embodiment, the first terminal connection unit 401 is connected to a plurality of the first terminal devices 6. The information acquisition unit 402 is configured to acquire the terminal information from the respective first terminal devices 6 connected to the first terminal connection unit 401 at the predetermined timing.

According to the communication system of the present embodiment as explained above, also with regard to the plural lower terminal devices 6 connected to the terminal connection unit 401, the information acquisition unit 402 acquires the terminal information from all the lower terminal devices 6 at the designated timing and stores the acquired terminal information in the buffer unit 407. Therefore, in contrast to a configuration where each time the lower superimposing apparatus 4 receives one of the information requests respectively directed to the plural lower terminal devices connected to the terminal connection unit 401 the lower superimposing apparatus 4 acquires the terminal information from only one terminal device corresponding to the received information request, it is possible to reduce a time lag between the terminal information of the plural lower terminal devices 6.

Further, in the communication system of the present embodiment, upon receiving the information request from the upper superimposing apparatus 3, the lower superimposing apparatus 4 returns, via the communication unit 403, the terminal information acquired from all the terminal devices 6 connected to the terminal connection unit 401. The upper superimposing apparatus 3 includes the storage unit 307 configured to store the terminal information returned by the lower superimposing apparatus 4. The upper superimposing apparatus 3 outputs the terminal information of the terminal device 6 designated as the destination of the information request, to the terminal device (upper terminal device) 5 serving as a receiver of the terminal information, from the storage unit 307.

In other words, in the communication system of the present embodiment, the information request includes the destination information indicative of the first terminal device 6 which the second terminal device 5 requests to provide the terminal information. The information acquisition unit 402 is configured to, upon receiving the information request from the second superimposing apparatus 3 via the first communication unit 403, retrieve the terminal information of the respective first terminal devices 6 from the buffer unit 407 and send the retrieved terminal information to the second superimposing apparatus 3 via the first communication unit 403. The second superimposing apparatus 3 is configured to, upon receiving the terminal information from the first superimposing apparatus 4, store the received terminal information therein and select the terminal information corresponding to the first terminal device 6 indicated by the destination information included in the information request from the stored terminal information, and send the selected terminal information to the second terminal device.

As mentioned in the above, in response to the information request from the upper superimposing apparatus 3, the lower superimposing device 4 simultaneously returns the terminal information of the plurality of the lower terminal devices 6 connected to the terminal connection unit 401. Once the upper superimposing apparatus 3 receives the terminal information from the lower superimposing device 4 collectively, even if the upper superimposing device 3 receives the information request requesting the terminal information which the upper superimposing device 3 has already acquired, the upper superimposing device 3 does not anew communicate with the lower superimposing device 4 but can return the terminal information to the lower terminal device 5. Hence, the communication system of the present embodiment has advantages in that it is possible to reduce the number of communication between the upper superimposing apparatus 3 and the lower superimposing apparatus 4 and to shorten response time starting at the time when the upper superimposing apparatus 3 outputs the information request and ending at the time when the terminal information is returned.

The other configurations and functions of the second embodiment are the same as those of the first embodiment.

Note that, with regard to each embodiment, the upper superimposing apparatus 3 and the lower superimposing apparatus 4 are explained as mutually different apparatuses. However, a superimposing apparatus used as the lower superimposing apparatus 4 may be configured to also function as the upper superimposing apparatus 3. In this arrangement, the superimposing apparatus is configured to be arbitrarily switched between a function of the upper superimposing apparatus 3 and a function of the lower superimposing apparatus 4 by use of such as a dip switch.

The invention claimed is:

1. A communication system comprising:
a plurality of first terminal devices, each of the first terminal devices being connected to a transmission path and having predetermined terminal information;
a second terminal device connected to the transmission path and configured to send an information request for requesting the first terminal device to provide the terminal information thereof;
a first superimposing apparatus interposed between the first terminal device and the transmission path; and
a second superimposing apparatus interposed between the second terminal device and the transmission path and configured to receive the information request from the second terminal device and to communicate with the first superimposing apparatus,
wherein
the transmission path is used for transmission of a transmission signal, and
the first superimposing apparatus comprises:
a terminal connector used for making connection with the first terminal device;
a communicator connected to the transmission path and configured to communicate with the second superimposing apparatus by use of the superimposed signal superimposed on the transmission signal in an available period in which the transmission path is available;
an information acquirer configured to acquire the terminal information from the first terminal device connected to the terminal connector at a predetermined timing; and
a buffer configured to store therein the terminal information acquired by the information acquirer, and
the second superimposing apparatus is configured to, upon receiving the information request from the second terminal device, send the information request to the first superimposing apparatus using the superimposing signal in the available period, and
the information acquirer is configured to, upon receiving the information request from the second superimposing apparatus via the communicator, retrieve the terminal information from the buffer and send the retrieved terminal information to the second superimposing apparatus via the communicator, and
the second superimposing apparatus is configured to, upon receiving the terminal information, provide the received terminal information to the second terminal device.

2. The communication system as set forth in claim 1, wherein
the predetermined timing is determined by a trigger received by the communicator via the transmission path.

3. The communication system as set forth in claim 2, wherein
the trigger is the information request.

4. The communication system as set forth in claim 3, wherein
the communication system further comprises a plurality of the first superimposing apparatuses;
the information request includes destination information indicative of the first terminal device which the second terminal device requests to provide the terminal information, and
the information acquirer is configured to perform a destination judgment process, an acquisition judgment process, a first reply process, a second reply process, and a third reply process, and
the information acquirer is configured to, upon receiving the information request from the second superimposing apparatus via the communicator, perform the destination judgment process, and
the information acquirer is configured to, in the destination judgment process, judge whether or not the first terminal device indicated by the destination information is identical to the first terminal device connected to the terminal connector, and
the information acquirer is configured to, upon concluding that the first terminal device indicated by the destination information is identical to the first terminal device connected to the terminal connector through the destination judgment process, perform the acquisition judgment process, and to, upon concluding that the first terminal device indicated by the destination information is not identical to the first terminal device connected to the terminal connector through the destination judgment process, perform the first reply process, and
the information acquirer is configured to, in the first reply process, acquire the terminal information from the first terminal device connected to the terminal connector, and
the information acquirer is configured to, in the acquisition judgment process, judge whether or not the terminal information of the first terminal device indicated by the destination information is stored in the buffer, and
the information acquirer is configured to, upon concluding that the terminal information of the first terminal device indicated by the destination information is stored in the buffer through the acquisition judgment process, perform the second reply process, and to, upon concluding that the terminal information of the first terminal device indicated by the destination information is not stored in the buffer through the acquisition judgment process, perform the third reply process, and
the information acquirer is configured to, in the second reply process, retrieve the terminal information of the first terminal device indicated by the destination information from the buffer and send the retrieved terminal information to the second superimposing apparatus via the communicator, and
the information acquirer is configured to, in the third reply process, acquire the terminal information from the first terminal device connected to the terminal connector, and send the acquired terminal information to the second superimposing apparatus via the communicator.

5. The communication system as set forth in claim 1, wherein
the second terminal device is configured to perform a collection process of sending in turn the information request to the first terminal devices, and
the information request sent in the collection process includes identification information commonly assigned, and
the information acquirer is configured to perform a reception judgment process of judging whether or not the information acquirer has already received the information request including the identification information identical to the identification information included in the currently received information request, and
the information acquirer is configured to, upon concluding that the information acquirer has already received the information request including the same identification information as the currently received information request through the reception judgment process, not perform the first reply process, and to, upon concluding that the information acquirer has not yet received the information request including the same identification information as the currently received information request through the reception judgment process, perform the first reply process.

6. The communication system as set forth in claim 1, wherein
the terminal connector is connected to a plurality of the first terminal devices, and
the information acquirer is configured to acquire the terminal information from the respective first terminal devices connected to the terminal connector at the predetermined timing.

7. The communication system as set forth in claim 6, wherein
the information request includes destination information indicative of the first terminal device which the second terminal device requests to provide the terminal information, and
the information acquirer is configured to, upon receiving the information request from the second superimposing apparatus via the communicator, retrieve the terminal information of the respective first terminal devices from the buffer and send the retrieved terminal information to the second superimposing apparatus via the communicator, and
the second superimposing apparatus is configured to, upon receiving the terminal information from the first superimposing apparatus, store the received terminal information therein and select the terminal information corresponding to the first terminal device indicated by the destination information included in the information request from the stored terminal information, and send the selected terminal information to the second terminal device.

8. The communication system as set forth in claim 1, wherein
the transmission path is used for transmission of the transmission signal based on a communication protocol different from a communication protocol between the first superimposing apparatus and the second superimposing apparatus, and
the available period is defined as a period in which a superimposed signal is allowed to be superimposed on the transmission signal.

* * * * *